United States Patent
Kuwahara

(10) Patent No.: US 8,462,703 B2
(45) Date of Patent: Jun. 11, 2013

(54) INFORMATION PROCESSING SYSTEM, INFORMATION PROCESSING APPARATUS AND COMMUNICATION PROCESS ALLOWING CONNECTION TO NETWORK IN ACCORDANCE WITH A PLURALITY OF COMMUNICATION METHODS

(75) Inventor: Masato Kuwahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 498 days.

(21) Appl. No.: 12/779,428

(22) Filed: May 13, 2010

(65) Prior Publication Data
US 2011/0205953 A1     Aug. 25, 2011

(30) Foreign Application Priority Data
Feb. 25, 2010   (JP) ................................ 2010-040558

(51) Int. Cl.
*H04W 4/00* (2009.01)
(52) U.S. Cl.
USPC ....................................... 370/328; 455/422.1
(58) Field of Classification Search
None
See application file for complete search history.

(56) References Cited

U.S. PATENT DOCUMENTS

| 2004/0066756 A1* | 4/2004 | Ahmavaara et al. | ........... 370/328 |
| 2006/0094427 A1* | 5/2006 | Buckley et al. | ................ 455/434 |
| 2006/0095954 A1* | 5/2006 | Buckley et al. | .................... 726/2 |
| 2007/0082697 A1* | 4/2007 | Bumiller et al. | ........... 455/552.1 |
| 2012/0058762 A1* | 3/2012 | Buckley et al. | ................ 455/434 |
| 2012/0178499 A1* | 7/2012 | Bumiller et al. | ........... 455/552.1 |

FOREIGN PATENT DOCUMENTS

| JP | 2005-086451 | 3/2005 |
| JP | 2007-194788 | 8/2007 |
| WO | 2006/109159 | 10/2006 |

OTHER PUBLICATIONS

Yaqub et al., "Autonomous Heterogeneous Networks Discovery Technique", Emerging Technologies, 2006, ICET '06, International Conference on , IEEE, PI, Jan. 1, 2006, pp. 473-479.

* cited by examiner

*Primary Examiner* — Clemence Han
(74) *Attorney, Agent, or Firm* — Nixon & Vanderhye PC

(57) ABSTRACT

An information processing system includes an information processing apparatus for connecting to a network by: 1) a first communication method with a first connection control device; and/or 2) a second communication method with a second connection control device. The information processing apparatus includes a relay destination determining unit for determining a relay destination based on an identifier provided by a first providing unit, and a second providing unit for providing a predetermined identifier defined under the first communication method for indicating the second connection control device to be a relay destination. The relay destination determining unit determines any of the first and second connection control devices to be the relay destination, based on any of the identifier provided by the first providing unit and the identifier provided by the second providing unit.

19 Claims, 13 Drawing Sheets

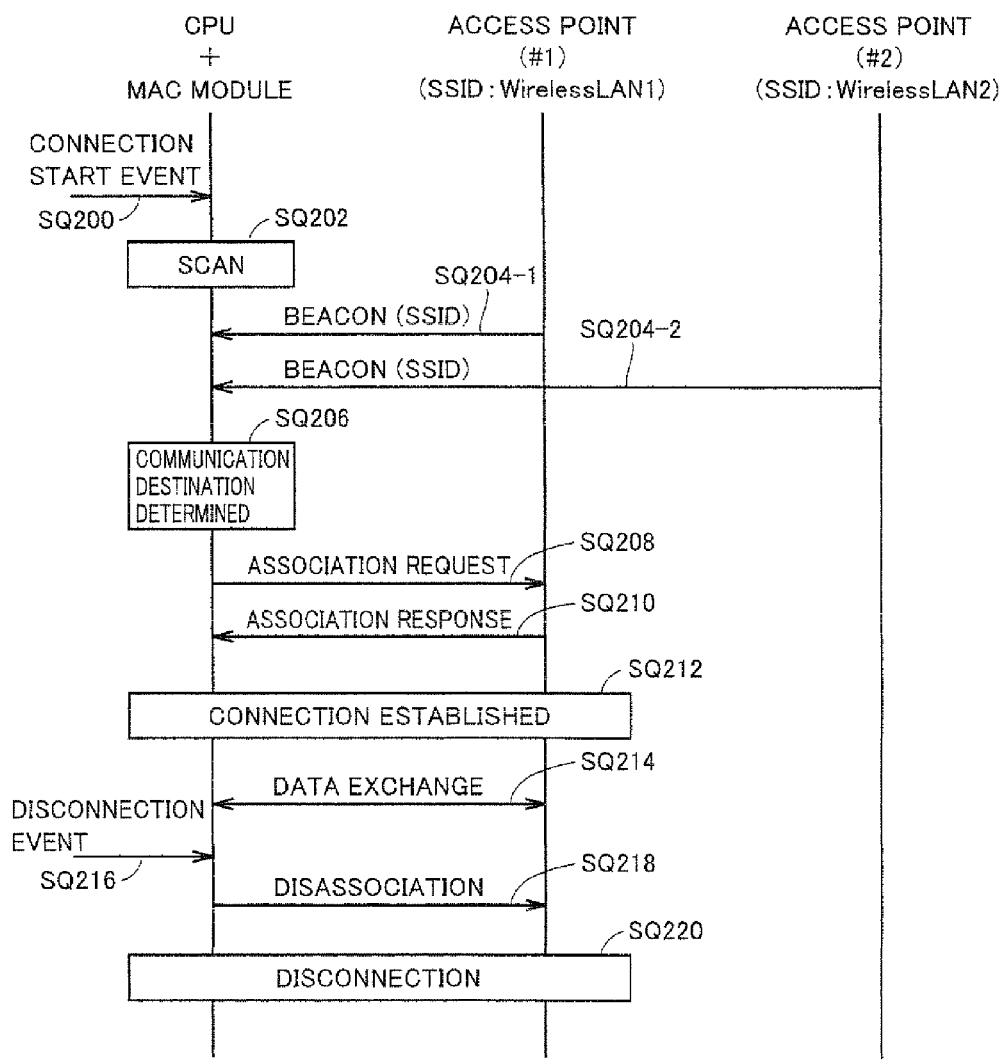

```
COMMUNICATION SETTING
ENTER SSID OF COMMUNICATION DESTINATION
[        ]
☑ VALIDATE SECURE COMMUNICATION
☐ WAN CONNECTED WITH PRIORITY
  IF AVAILABLE
```

INFORMATION PROCESSING SYSTEM, INFORMATION PROCESSING APPARATUS AND COMMUNICATION PROCESS ALLOWING CONNECTION TO NETWORK IN ACCORDANCE WITH A PLURALITY OF COMMUNICATION METHODS

This nonprovisional application is based on Japanese Patent Application No. 2010-40558 filed with the Japan Patent Office on Feb. 25, 2010, the entire contents of which are hereby incorporated by reference.

FIELD

The present invention relates to an information processing system, an information processing apparatus and a communication process that allow connection to a network in accordance with a plurality of communication methods. Particularly, the present invention relates to a technique enabling, when an application executed by an information processing apparatus is created to support only a specific communication method, use of other communication method or methods.

BACKGROUND AND SUMMARY

With rapid development of information and communication technology of recent years, various information processing apparatuses using a network communication function have come to be practically used. By way of example, Japanese Patent Laying-Open No. 2007-194788 discloses a game machine having wireless LAN function, connectable, for example, to the Internet through a connection control device such as an access point.

Known configurations to connect to a network include, in addition to wireless LAN, configurations using a so-called cellular wireless communication technique such as a portable telephone and PHS (Personal Handy phone System) and configurations using infrared communication. Such communication means have characteristics different from each other in service coverage, speed of communication and power consumption.

In view of the foregoing, information processing apparatuses that can use a plurality of communication methods to enable connection to a network at any place have been proposed. For example, Japanese Patent Laying-Open No. 2005-86451 discloses a wireless communication system integrating a wireless LAN system and a cellular radio system.

Let us consider adding, to an information processing apparatus having a communication function using a certain first communication method (for example, wireless LAN) such as disclosed in Japanese Patent Laying-Open No. 2007-194788 described above, a function (hardware) to enable use of another, second communication method (for example, the cellular radio system mentioned above).

An information processing apparatus represented, for example, by a game machine allows attachment of various programs (applications) from outside. For a game machine such as disclosed in Japanese Patent Laying-Open No. 2007-194788, a program used for processing is stored in an ROM (Read Only Memory) in a memory card and distributed. Therefore, if a program created for information processing apparatuses having only the communication function using the first communication method is to be executed by an information processing apparatus capable of using a new, second communication method in addition to the first communication method, it is necessary to update a communication program (driver software) included in the program, to enable use of the second communication method.

When the communication program as such is updated and communication is to be done with the communication method switched between the first communication method and the second communication method, controls corresponding to respective communication methods are required. This undesirably results in complicated switching control between the first and second communication methods.

The present invention was made to solve such a problem and its object is to provide an information processing system, an information processing apparatus and a communication process, configured to allow connection to a network in accordance with a plurality of communication methods (communication systems) which still ensure easy switching among the plurality of communication methods.

According to a first aspect, the present invention provides an information processing system, including: a first connection control device and a second connection control device connected to a network; and an information processing apparatus configured to be connected to the network through any of the first connection control device and the second connection control device, in accordance with any of a first communication method with the first connection control device and a second communication method, different from the first communication method, with the second connection control device. The first connection control device includes a first providing unit for providing the information processing apparatus with an identifier defined under the first communication method. The information processing apparatus includes a relay destination determining unit configured to determine the first connection control device to be a relay destination for connection to the network, based on the identifier provided by the first providing unit, and a second providing unit for providing the relay destination determining unit with a predetermined identifier defined under the first communication method, for indicating the second connection control device to be the relay destination. The relay destination determining unit is operative to determine any of the first connection control device and the second connection control device to be the relay destination, based on any of the identifier provided by the first providing unit and the identifier provided by the second providing unit.

According to the first aspect of the present invention, in the information processing apparatus capable of using both the first and second communication methods to connect to the network, an identifier defined under the first communication method is provided when the second communication method is to be used. Consequently, it becomes possible for the relay destination determining unit to determine, not only when the first communication method is used but also when the second communication method is used, the relay destination based on the predetermined identifier defined under the first communication method. Therefore, even if the relay destination determining unit supports only the communication in accordance with the first communication method, easy switching between the first and second communication methods is possible.

According to a second aspect, the present invention provides an information processing apparatus connectable to a network by any of communication in accordance with a first communication method with a first connection control device connected to the network and a second communication method, different from the first communication method, with a second connection control device connected to the network, through any of the first connection control device and the second connection control device. The information processing apparatus includes: an obtaining unit for obtaining an identifier defined under the first communication method, from the first connection control device; a relay destination determining unit configured to determine the first connection control device to be a relay destination for connection to the network, based on the identifier obtained by the obtaining unit; and a providing unit for providing the relay destination determining unit with a predetermined identifier defined under the first communication method, for indicating the second connection control device to be the relay destination. The relay destination determining unit is operative to determine any of the first connection control device and the second connection control device to be the relay destination, based on the identifier obtained by the obtaining unit and the identifier provided by the providing unit.

According to the second aspect of the present invention, even when communication function in accordance with the second communication method is added to the first communication method as the communication function used for connection to the network, communication in accordance with the second communication method is possible using the identifier defined under the first communication method. Therefore, even when the second communication method is used in addition to the first communication method, it is possible for the relay destination determining unit to determine the relay destination based on the predetermined identifier defined under the first communication method. Therefore, even if the relay destination determining unit supports only the communication in accordance with the first communication method, easy switching between the first and second communication methods is possible.

According to a third aspect of the present invention, based on the second aspect described above, the providing unit includes a holding unit for holding in advance an identifier defined under the first communication unit; and the providing unit is configured to provide the relay destination determining unit with the identifier held by the holding unit.

According to the third aspect of the present invention, it is possible to allocate in advance the identifier for communication with the second connection control device (typically as initial setting of the information processing apparatus) and, therefore, it is possible for the user to switch and use the first and second communication methods without regard to the difference between the communication methods.

According to a fourth aspect of the present invention, based on the second or third aspect described above, the information processing apparatus further includes a connecting unit for connecting to the network through any of the first connection control device and the second connection control device, using the identifier defined under the first communication method.

According to the fourth aspect of the present invention, what is required of the connecting unit of the information processing apparatus is simply that it is capable of the connecting process based on the identifier defined under the first communication method. It is unnecessary to mount any special function to use the second communication method. Therefore, the mechanism necessary for the switching between the first and second methods can be simplified.

According to a fifth aspect of the present invention, based on the fourth aspect described above, the information processing apparatus further includes a storage unit for storing a connection program for connecting to the network using the identifier defined under the first communication method. The connection program stored in the storage unit instructs a computer of the information processing apparatus to have the connecting unit connected to the network.

According to the fifth aspect of the present invention, even the connection program supporting only the first communication method can use the second communication method. Therefore, even a program not expecting use of the second communication method can provide the function necessary to switch between the first and second communication methods.

According to a sixth aspect of the present invention, based on any of the second to fifth aspects described above, if the obtaining unit fails to obtain the identifier and the providing unit provides the identifier, the relay destination determining unit determines the second connection control device to be the relay destination based on the identifier provided by the providing unit.

According to the sixth aspect of the present invention, even in an environment in which the information processing apparatus cannot use the first communication method, it can be connected to the network using the second connection control device as a relay destination, if the apparatus can use the second communication method.

According to a seventh aspect of the present invention, based on any of the second to sixth aspects described above, the information processing apparatus further includes a determining unit for determining whether the identifier obtained by the obtaining unit or the identifier provided by the providing unit matches a predetermined identifier. The relay destination determining unit determines the first connection control device or the second connection control device that corresponds to the identifier matching the predetermined identifier to be the relay destination.

According to the seventh aspect of the present invention, the first connection control device communicable with the information processing apparatus is determined in advance, and between the communicable first and second communication control devices, the relay destination is determined. Therefore, it is possible to prevent an uncommunicable first connection control device from being determined to be the relay destination. Further, since the communicable first connection control device and the second connection control device can be handled equally, the process for determining the relay destination can be simplified.

According to an eighth aspect of the present invention, based on any of the second to sixth aspects described above, the relay destination determining unit is configured to determine any of the first connection control device and the second connection control device to be the relay destination, based on a priority set for each identifier defined under the first communication method.

According to the eighth aspect of the present invention, priority of relay destinations is set in advance, and depending on the situation, the destination of highest priority can be determined. Therefore, it is possible for the user to connect to the network without regard to the process for determining the relay destination.

According to a ninth aspect of the present invention, based on the eighth aspect described above, the relay destination determining unit further includes a logic for changing the priority.

According to the ninth aspect of the present invention, it is possible to freely change to any communication method or to freely change the priority for selecting the connection control device to be used, in accordance with an application or the like to be executed.

According to a tenth aspect of the present invention, based on the eighth aspect described above, the providing unit includes a portion for holding a plurality of identifiers with corresponding priorities different from each other, and a logic for selecting and providing to the relay destination determining unit one of the plurality of identifiers.

According to the tenth aspect of the present invention, even when the priority is fixed in advance, it is possible to indirectly change the priority for the second communication method, by dynamically changing the identifier defined under the first communication method to indicate the second connection control device as the relay destination. Therefore, the priority regarding the second communication method can be freely changed without influencing the priority or priorities set for the first communication method.

According to an eleventh aspect of the present invention, based on any of the second to tenth aspects described above, the information processing apparatus further includes a connection establishment starting unit for starting, after the obtaining unit started obtaining an identifier defined under the first communication method, a process for establishing connection with the second connection control device in accordance with the second communication method.

According to the eleventh aspect of the present invention, when connection to the network is to be established through the second communication unit, it is necessary that the relay destination determining unit completes obtaining the identifier defined under the first communication method and that the connection procedure between the second communication unit and the second connection control unit is completed. Namely, two procedures must be completed. As these procedures are executed in a parallel manner, faster connection to the network becomes possible.

According to a twelfth aspect of the present invention, based on any of the second to eleventh aspects described above, the information processing apparatus further includes: an access controller in accordance with the first communication method; an access controller in accordance with the second communication method; and a bridge connecting the access controller in accordance with the second communication method and the access controller in accordance with the first communication method, to mediate between communication by the first communication method and communication by the second communication method.

According to the twelfth aspect of the present invention, the access controller for the first communication method and the access controller for the second communication method are provided, and the controllers are connected by a bridge. Therefore, general controllers may be used as respective access controllers. As a result, only the bridge has to be formed uniquely for the information processing apparatus, and hence, cost can be reduced. At the same time, upward compatibility to the information processing apparatus supporting only the first communication method can be attained.

According to a thirteenth aspect of the present invention, based on any of the second to twelfth aspects described above, the providing unit is configured to provide the relay destination determining unit with an identifier defined under the first communication method of the first connection control device, as a dummy.

According to the thirteenth aspect of the present invention, the communication unit, which is actually the unit in accordance with the second communication method, can be regarded as the communication unit in accordance with the first communication method, when viewed from the relay destination determining unit. Therefore, the configuration to use the second communication method can be handled as an equivalent to the first connection control device as the relay destination in accordance with the first communication method. Therefore, even if the relay destination determining unit supports only the communication in accordance with the first communication method, it is possible to freely select the first communication method or the second communication method.

According to a fourteenth aspect of the present invention, based on any of the second to thirteenth aspects described above, narrow area wireless communication with the first connection control device is established under the first communication method, and wide area wireless communication with the second connection control device is established under the second communication method.

According to the fourteenth aspect of the present invention, it is possible to selectively use the two wireless communication methods having different characteristics, in response to a request from a user or from an application.

According to a fifteenth aspect of the present invention, based on the second aspect described above, the identifier defined under the first communication method is an identifier of a network including the first connection control device.

According to the fifteenth aspect of the present invention, it is possible to manage the relay destination using a general identifier.

According to a sixteenth aspect, the present invention provides a communication process in a system including at least one information processing apparatus configured to connect to a network through any of a first connection control device and a second connection control device connected to the network. The system includes a first communication unit for communication with the first connection control device in accordance with a first communication method, and a second communication unit for communication with the second connection control device in accordance with a second communication method different from the first communication method. The communication process includes: the obtaining step of obtaining an identifier defined under the first communication method from the first connection control device; the relay destination determining step of determining a connection control device identified under the identifier obtained at the obtaining step to be a relay destination for connection to the network; and the providing step of providing a predetermined identifier defined under the first communication method, for indicating the second connection control device to be a relay destination. The relay destination determining step includes the step of determining any of the first connection control device and the second connection control device to be the relay destination, based on the identifier obtained at the obtaining step and the identifier provided at the providing step.

According to a seventeenth aspect, the present invention provides an information processing system including an information processing apparatus connectable to a network by any of communication in accordance with a first communication method with a first connection control device connected to the network and a second communication method, different from the first communication method, with a second connection control device connected to the network, through any of the first connection control device and the second connection control device. The information processing system includes: an obtaining unit for obtaining an identifier defined under the first communication method, from the first connection control device; a relay destination determining unit configured to determine the first connection control device to be a relay destination for connection to the network, based on the identifier obtained by the obtaining unit; and a providing unit for providing the relay destination determining unit with a predetermined identifier defined under the first communication method, for indicating the second connection control device to be the relay destination. The relay destination determining unit is operative to determine any of the first connection control device and the second connection control device to be the relay destination, based on the identifier obtained by the obtaining unit and the identifier provided by the providing unit.

According to the sixteenth and seventeenth aspects of the present invention, similar effects as the second aspect of the present invention can be attained.

The information processing apparatus according to an eighteenth aspect of the present invention includes: a first information processing apparatus connectable to a network by communication in accordance with a first communication method with a first connection control device connected to the network, through the first connection control device; and a second information processing apparatus connectable to the network by any of communication in accordance with the first communication method with the first connection control device and communication in accordance with a second communication method, different from the first communication method, with a second connection control device connected to the network, through any of the first connection control device and the second connection control device. The first information processing apparatus includes an obtaining unit for obtaining an identifier defined under the first communication method from the first connection control device. The second information processing apparatus includes the obtaining unit, and a providing unit for providing a predetermined identifier defined under the first communication method, for indicating the second connection control device to be a relay destination. If a computer of the first information processing apparatus executes an information processing program, the first information processing apparatus provides a function of connecting to the network through the first connection control device, based on the identifier identified under the first communication method. If a computer of the second information processing apparatus executes the information processing program, the second information processing apparatus provides a function of connecting to the network through any of the first connection control device and the second connection control device, based on the identifier defined under the first communication method.

According to the eighteenth aspect of the present invention, no matter which of the first information processing apparatus connectable to the network in accordance with the first communication method and the second information processing apparatus connectable to the network in accordance with the second communication method in addition to the first communication method is used for execution, the communication function provided on the executing information processing apparatus (computer) can be fully utilized.

According to a nineteenth aspect of the present invention, based on the eighteenth aspect described above, in the information processing program, an identifier defined under the first communication method is specified to indicate the second connection control device to be a relay destination; and the specified identifier is validated if the information processing program is executed by the second information processing apparatus.

According to the nineteenth aspect of the present invention, the identifier defined under the first communication method to indicate the second connection control device as the relay destination is validated in accordance with the hardware (information processing apparatus) by which the information processing program is executed. Therefore, if the first communication method and the second communication method are both supported, unnecessary process does not take place.

The information processing apparatus according to a twentieth aspect of the present invention has upward compatibility to an information processing apparatus including a first communication unit communicating with a first connection control device connected to a network in accordance with a first communication method, an obtaining unit for obtaining an identifier defined under the first communication method from the first connection control device, and a relay destination determining unit configured to determine the first connection control device to be a relay destination for connection to the network, based on the identifier obtained by the obtaining unit. The information processing apparatus includes; the first communication unit; a second communication unit for communication with a second connection control device connected to the network in accordance with a second communication method different from the first communication method; the relay destination determining unit; and a providing unit for providing the relay destination determining unit with a predetermined identifier defined under the first communication method, for indicating the second connection control device to be a relay destination. The relay destination determining unit is operative to determine any of the first connection control device and the second connection control device to be the relay destination, based on the identifier obtained by the obtaining unit and the identifier provided by the providing unit.

According to the twentieth aspect of the present invention, the effect similar to the eighteenth aspect of the present invention can be attained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 shows a communication sequence when wireless LAN connection is used in the game machine in accordance with the embodiment of the present invention.

DESCRIPTION OF THE PREFERRED EMBODIMENTS

Figure 1:
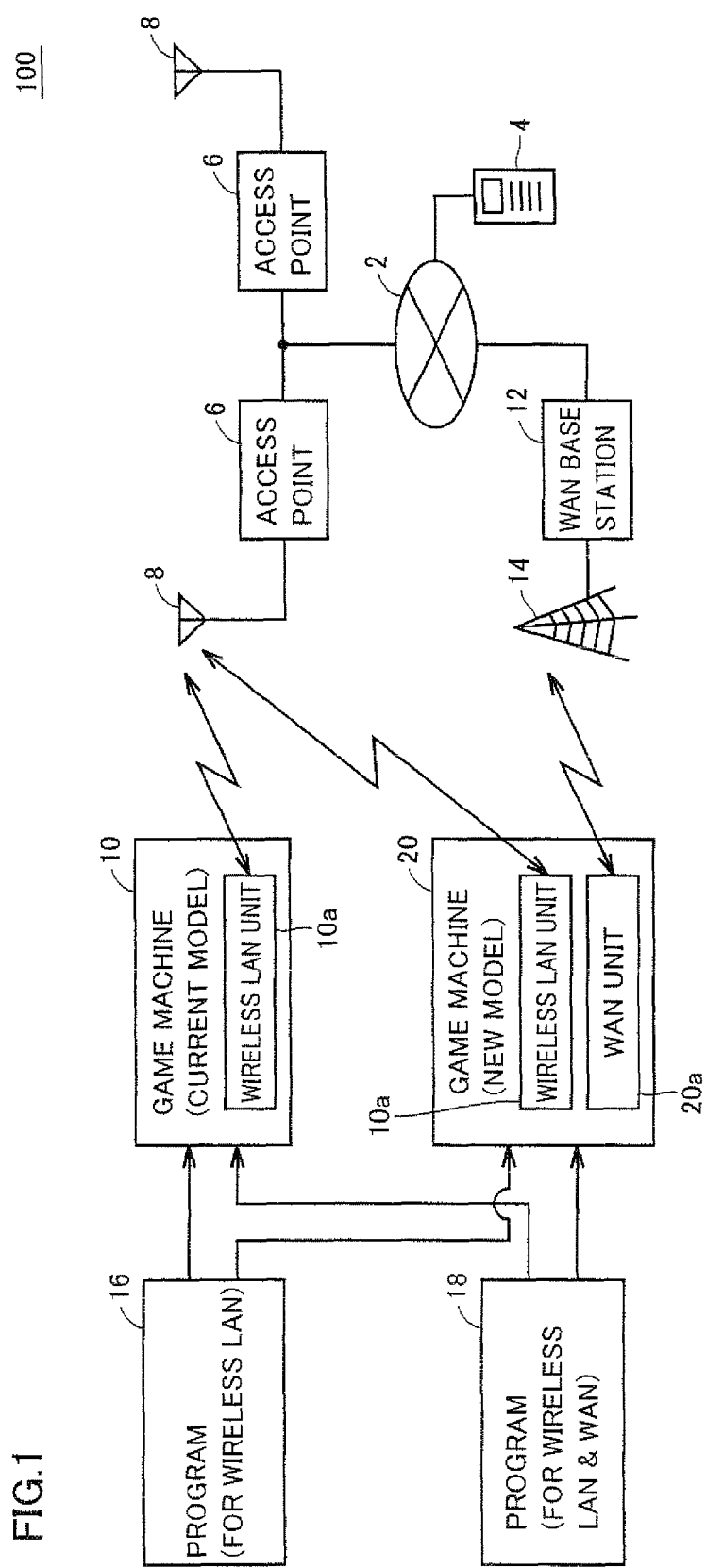
FIG. 1 shows a schematic configuration of a network system in accordance with an embodiment of the present invention.

Embodiments of the present invention will be described in detail with reference to the figures. The same or corresponding portions in the figures are denoted by the same reference characters and description thereof will not be repeated.

<A. Outline>

According to an aspect of the present invention, a situation is considered in which a game machine having a communication function in accordance with a first communication method is manufactured and sold and, thereafter, a game machine having, in addition to the communication function in accordance with the first communication method, a communication function in accordance with a second communication method different from the first communication method is manufactured and sold. For convenience of distinction, the former game machine will also be referred to as a "current model machine" and the latter machine will also be referred to as a "new model machine." At the time of actual implementation, it is not always the case that both old and new model machines exist together. Further, it is unnecessary to distinguish whether a machine is a "current model machine" or a "new model machine."

Specifically, a current model machine can connect (also referred to as "access") to a network or the like using the communication function in accordance with the first communication method, and a new model machine can connect to a network or the like using the communication function in accordance with the first communication method or the communication function in accordance with the second communication method different from the first communication method. Here, a user of the new model machine can selectively use more appropriate communication method in accordance with the status of use.

By way of example, assume that a communication method having relatively high speed of communication but relatively large power consumption and a communication method having relatively slow speed of communication but relatively small power consumption are available. Then, the communication method can be switched to a more appropriate method considering the situation, for example, when it is desired to receive data of large amount of information such as images or video images, or when it is desired to use the game machine for a long time with reduced power consumption. It is also possible to support more than two communication methods.

Generally, a method of updating a communication program (driver software) included in a game program has been known as an approach to be used in the new model machine such as described above. If the communication program is updated, when communication is to be done with the communication method switched between the first communication method and the second communication method, controls corresponding to respective communication methods are required. This undesirably results in complicated switching control between the first and second communication methods. Therefore, a platform allowing easy switching among a plurality of communication methods even in a configuration allowing connection to a network through the plurality of communication methods is provided.

<B. System Configuration>

In the following, a typical implementation will be described with reference to FIG. 1. FIG. 1 is a schematic diagram of a network system 100 in accordance with an embodiment of the present invention.

In network system 100 shown in FIG. 1, it is assumed that both the first and second communication methods are selectively used for wireless connection. Specifically, the first communication method (communication system) is assumed to be a communication method in compliance with IEEE (the institute of Electrical and Electronics Engineers, Inc.) 802.11 series standard (hereinafter also referred to as "wireless LAN"). The second communication method (communication system) is assumed to be a communication method in compliance with IMT (International Mobile Telecommunications) 2000 standard, that is, a so-called third generation mobile communication system (hereinafter also referred to as "WAN (Wide Area Network)").

The first and second communication methods are not limited to wireless communication methods, and one or both may be wired communication methods. Further, wireless communication methods other than the standards mentioned above, such as PHS (Personal Handy phone System) and WiMAX (Worldwide Interoperability for Microwave Access) may be adopted.

A game machine of any type may be used as the game machine in accordance with the present embodiment, provided that it has the communication function as described above. In place of a computer of a game machine, the present invention is also applicable to a general purpose information processing apparatus (typically, a portable personal computer, a portable workstation, a portable terminal, a PDA (Personal Digital Assistance) or a portable telephone). In such a case, an application program is executed as a program that corresponds to the game program, in the information processing apparatus.

In the present embodiment, it is preferred that the first and second communication methods are mutually different methods.

FIG. 1 shows a game machine 10 as current model machine mounting only a wireless LAN unit 10a, and a game machine 20 as a new model machine mounting a wireless LAN unit 10a and a WAN unit 20a. Game machines 10 and 20 both allow attachment of storage medium 16 or 18 storing a program. When the program stored in storage medium 16 or 18 is executed, an application using the communication function is provided.

Game machine 20 as the new model machine has upward compatibility to game machine 10 as the current model machine and, therefore, the program stored in storage medium 16 can be executed both by game machine 10 and game machine 20.

Further, according to the present embodiment, even a program designed only for wireless LAN stored in storage medium 16 provides communication using both wireless LAN unit 10*a* and WAN unit 20*a* mounted on game machine 20, by configuration characteristics of the present embodiment, which will be described later.

The program stored in storage medium 18 is created to be usable both by game machine 10 as the current model machine and game machine 20 as the new model machine. Therefore, the program stored in storage medium 18 can be executed both in game machine 10 and game machine 20. Here, the program stored in storage medium 18 determines hardware configuration and the like of the game machine in which it is to be executed, and performs processes in accordance with the hardware configuration.

Network system 100 includes a network 2 such as the Internet. Typically, a server 4 is connected to network 2. As will be described later, various game machines can be connected to server 4 through network 2. Server 4 is typically a device providing various types of network service, such as a Web server, a download server, a server for distributing various contents, a mail server or a search server. Alternatively, game machines may directly communicate with each other through network 2 (for example, by a co-called peer-to-peer connection).

To network 2, an access point 6 is also connected. Access point 6 is a connection control device for providing wireless access in accordance with wireless LAN as an example of the first communication method, and it relays connection from game machine 10 or 20 to network 2. Access point 6 receives, through an antenna 8, a radio signal (for example, in 2.4 GHz band or 5 GHz band) in accordance with wireless LAN transmitted from game machines 10 and 20.

To network 2, a WAN base station 12 is also connected. WAN base station 12 is a connection control device for providing wireless access in accordance with WAN as an example of the second communication method, and it relays connection from game machine 10 or 20 to network 2. WAN base station 12 receives, through an antenna 14, a radio signal (for example, in 800 MHz band or 2 GHz band) in accordance with WAN transmitted from game machines 10 and 20.

Wireless LAN as an example of the first communication method has relatively narrow service coverage as compared with WAN as an example of the second communication method. Specifically, game machines 10 and 20 perform narrow area communication with access point 6 using wireless LAN, and perform wide area communication with WAN base station 12 using WAN. Therefore, when the same service coverage is to be realized, it become necessary to increase the number of access points 6 than WAN base stations 12. Therefore, depending on installation situation of access points 6, it is impossible for game machines 10 and 20 to connect to network 2 using wireless LAN.

On the other hand, it is necessary in WAN to ensure relatively large number of channels and, therefore, speed of communication is relatively slow as compared with wireless LAN. Further, it is necessary to make relatively high the intensity of radio signals to be transmitted and, hence, power consumption becomes relatively large.

Therefore, it is expected that wireless LAN is mainly used for communication in a big city having a large number of access points 6, and WAN having wider service coverage is used for communication at other places.

As described above, in network system 100, game machine 20 performs either the communication utilizing access point 6 and wireless LAN or the communication utilizing WAN base station 12, and it is connectable to network 2 either through access point 6 or WAN base station 12.

In the configuration shown in FIG. 1, game machine 10 or 20 is configured to be connected to server 4 connected to the same network 2, no matter whether the machine accesses via access point 6 or WAN base station 12. Other than the above, a configuration may be possible in which connection to a certain network is established when access is made via access point 6 and connection to a different network is established when access is made via WAN base station 12. In that case, it is preferred that substantially independent servers are prepared and same information is shared by the servers.

<C. Types of Programs>

It is assumed that the program stored in storage unit 16 shown in FIG. 1 is created considering only the current model machine and only supports wireless LAN as the first communication method. On the other hand, it is assumed that the program stored in storage unit 18 is created considering both the current model machine and the new model machine, and supports both wireless LAN as the first communication method and WAN as the second communication method.

When storage medium 16 is attached to game machine 10 as the current model machine and the program stored thereon is executed, communication using wireless LAN unit 10*a* mounted on game machine 10 is possible.

If programs stored in storage medium 16 and 18 are fixed and contents thereof cannot easily be updated, it is difficult to add driver software to support WAN unit 20*a*.

Therefore, in game machine 20 as the new model machine in accordance with the present embodiment, an interface similar to the one for wireless LAN unit 10*a* is provided for WAN unit 20*a*, so as to enable use of WAN unit 20*a* even by a program that has only the driver software for using wireless LAN unit 10*a*. Therefore, no matter which of storage medium 16 and 18 is attached, game machine 20 is connectable to network 2 either through access point 6 or WAN base station 12.

As the storage medium 16 and 18 in accordance with the present embodiment, known non-transitory computer-readable medium capable of magnetically, optically or electronically storing information such as a memory card, a cartridge or a DVD may be used. In the following description, a memory card is used as an example of the storage medium.

<D. Machine Configuration>

In the following, configurations of various machines and devices shown on network system 100 of FIG. 1 will be described.

[d1. Configuration of Game Machine (New Model Machine) 20]

Figure 2:
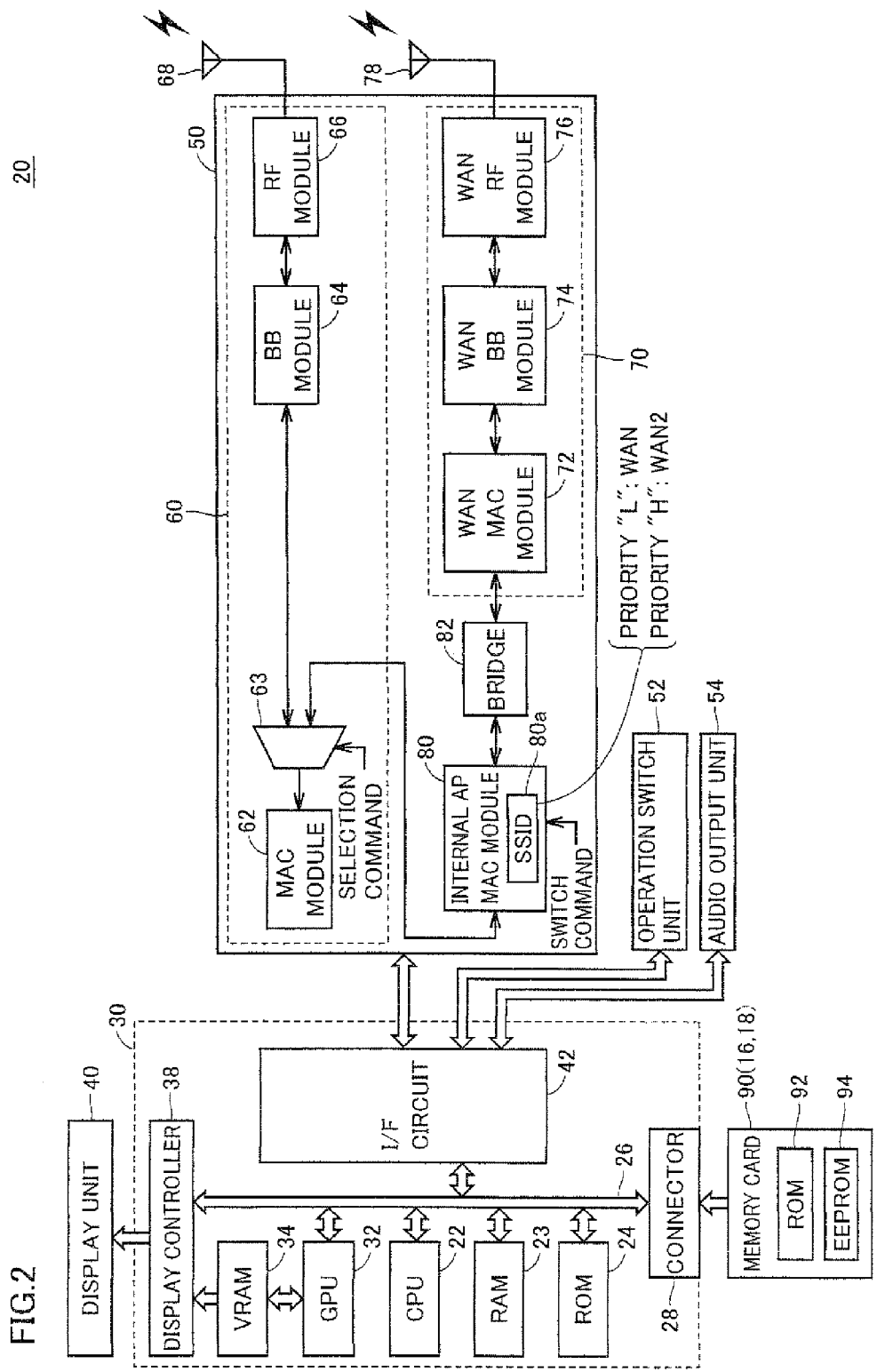
FIG. 2 is a block diagram showing a configuration of a game machine in accordance with the embodiment of the present invention.

FIG. 2 is a block diagram showing a configuration of game machine 20 in accordance with an embodiment of the present invention.

Referring to FIG. 2, game machine 20 includes an electronic circuit board 30 having circuit components mounted thereon, a display unit 40, a communication unit 50, an operation switch unit 52, and an audio output unit 54. Further, a memory card 90 as an example of the storage medium can be attached to game machine 20.

Electronic circuit board 30 is a portion executing various processes in game machine 20, and it includes: a CPU (Central Processing Unit) 22; an RAM (Random Access Memory) 23; an ROM (Read Only Memory) 24; a connector 28; a graphic processing unit (GPU, hereinafter also simply referred to as "GPU") 32; a video memory (VRAM: Video Random Access Memory; hereinafter also simply referred to as "VRAM") 34; a display controller 38; and an interface circuit (hereinafter also simply referred to as "I/F circuit") 42. These units are configured to be able to transfer data to each other through a bus 26.

To connector 28, memory card 90 is detachably attached. Memory card 90 includes: an interface circuit, not shown, for electrical contact with connector 28; an ROM 92 having an instruction set (program) fixed for operating CPU 22; and an EEPROM (Electrically Erasable Programmable ROM) 94 for holding information generated in accordance with various processes or information set by a user or the like in a non-volatile manner. The program stored in ROM 92 of memory card 90 may be entirely or partially developed on RAM 23 of electronic circuit board 30 as the process is executed. The data held in EEPROM 94 of memory card 90 may be entirely or partially held temporarily in RAM 23, in accordance with the process by CPU 22.

CPU 22 reads necessary program, set data and image/sound data from ROM 92 or EEPROM 94 of memory card 90 connected through connector 28, from ROM 24 or I/F circuit 42, and loads the same to RAM 23. Specifically, RAM 23 is used as a buffer memory and/or a working memory. Then, CPU 22 executes codes of the program loaded to RAM 23, whereby various information processing operations including the communication process as will be described later are executed.

ROM 24 has programs fixed therein to perform basic processes of game machine 20. Specifically, ROM 24 stores a boot program and a resident program of game machine 20.

GPU 32, VRAM 34 and display controller 38 function as a rendering unit for rendering an image on display unit 40. These components may be implemented by using a single chip ASIC (Application Specific Integrated Circuit). More specifically, GPU 32 generates, in response to a graphics command (image forming instruction) applied from CPU 22, image data in accordance with contents to be displayed on display unit 40. The image data is successively written to VRAM 34. Display controller 38 outputs a video signal based on the image data written to VRAM 34. It is also possible that CPU 22 provides an image generating program for dynamically generating image data to GPU 32, and GPU 32 generates necessary image data.

Display unit 40 is an interface providing the user with visual information and, typically, a liquid crystal display (LCD), an EL (Electronic Luminescence) display, a plasma display or the like is used.

I/F circuit 42 exchanges data to/from CPU 22, communication unit 50, operation switch unit 52 and audio output unit 54.

Operation switch unit 52 is an input unit for receiving a user operation, including buttons, a mouse, a touch panel and the like positioned appropriately as needed. When the user operates operation switch unit 52, an operation signal in accordance with the operation is transmitted through I/F circuit 42 to, for example, CPU 22.

Audio output unit 54 is typically a speaker, and it provides the user with audio information, based on audio data generated by CPU 22. As audio output unit 54, a connector for attaching a headphone may be prepared.

Communication unit 50 provides a communication function to connect to network 2 (FIG. 1). Specifically, communication unit 50 provides the communication function in accordance with wireless LAN as the first communication method and the communication function in accordance with WAN as the second communication method.

More specifically, communication unit 50 includes a wireless LAN communication unit 60 performing wireless communication with access point 6 (FIG. 1) in accordance with the wireless LAN communication method, and a WAN communication unit 70 performing wireless communication with WAN base station 12 in accordance with the WAN communication method.

Wireless LAN communication unit 60 includes: a medium access controller (MAC) module (hereinafter also simply referred to as "MAC module") 62; a multiplexer 63; a baseband (BB) module (hereinafter also simply referred to as "BB module") 64; and a radio frequency (RF) module (hereinafter also simply referred to as "RF module") 66.

MAC module 62 is an access controller for transfer control of wireless LAN. MAC module 62 controls transfer of a data packet (frame) to/from access point 6. More specifically, MAC module 62 divides data output from CPU 22 to predetermined data packets and transmits, and couples data packets received from a connection destination through access point 6 to decode to one data block. Further, MAC module 62 performs error detection and error correction of the received data, and resends data of which transmission has failed.

Further, MAC module 62 also has a connection management function, for managing connection to access point 6. By way of example, based on an identifier defined in wireless LAN, MAC module 62 identifies an access point 6 as a relay destination. More specifically, in wireless LAN, connection is controlled using an identifier referred to as an SSID (Service Set Identifier) and/or ESSID (Extended Service Set Identifier). The SSID is essentially an identifier allocated to each access point 6, and the ESSID is an identifier allocated to a group including a plurality of access points. It is noted that SSID is sometimes used in the meaning of ESSID. In the following, "SSID" will be used as a term having the narrow meaning of SSID and ESSID.

As will be described later, if a user use connection to a network, he/she designates (or registers in advance) an SSID that indicates an intended access point 6 (or its group). Then, MAC module 62 searches for a usable access point 6 and establishes wireless connection with access point 6 having the designated SSID.

Basically, MAC module 62 has a function of determining any access point 6 to be a relay destination (hereinafter also referred to as a "connection destination" or "communication destination") for connection to network 2, based on the identifier (SSID) provided by access point 6.

At the time of data transmission, BB module 64 encodes a signal (digital data) transmitted from MAC module 62 in accordance with a prescribed processing rule, and generates a baseband signal (modulated signal) representing the encoded data. RF module 66 up-converts the modulated signal received from BB module 64 to a carrier frequency, and thereby generates a radio signal. The radio signal generated by RF module 66 is emitted from an antenna 68.

At the time of data reception, RF module 66 down-converts a radio signal received from access point 6 and whereby generates a baseband signal. BB module 64 decodes the baseband signal received from RF module 66, and extracts only a data packet or packets addressed to it. Further, BB module 64 outputs the extracted data packet to MAC module 62.

WAN communication unit 70 includes: a medium access controller (MAC) module for WAN communication (hereinafter also simply referred to as "WAN_MAC module) 72; a baseband (BB) module for WAN communication (hereinafter also simply referred to as "WAN_BB module") 74; and a radio frequency (RF) module for WAN communication (hereinafter also simply referred to as "WAN_RF module") 76.

WAN_MAC module 72 is an access controller for controlling transfer in WAN. WAN_MAC module 72 controls transfer of data packets (frames) to/from WAN base station 12. More specifically, WAN_MAC module 72 divides input data to predetermined data packets and transmits, and couples data packets received from a connection destination through WAN base station 12 to decode to one data block. Further, WAN_MAC module 72 performs error detection and error correction of the received data, and resends data of which transmission has failed.

At the time of data transmission, WAN_BB module 74 encodes a signal (digital data) transmitted from WAN_MAC module 72 in accordance with a prescribed processing rule, and generates a baseband signal (modulated signal) representing the encoded data. WAN_RF module 76 up-converts the modulated signal received from WAB_BB module 74 to a carrier frequency, and thereby generates a radio signal. The radio signal generated by WAB_RF module 76 is emitted from an antenna 78.

At the time of data reception, WAN_RF module 76 down-converts a radio signal received from WAN base station 12 and whereby generates a baseband signal. WAN_BB module 74 decodes the baseband signal received from WAN_RF module 76, and extracts only a data packet or packets addressed to it. Further, WAN_BB module 74 outputs the extracted data packet to WAN_MAC module 72.

Communication unit 50 further includes an internal application medium access control module (hereinafter also referred to as "internal AP_MAC module") 80 and a bridge 82.

Internal AP_MAC module 80 provides a function enabling MAC module 62, which manages connection based on the identifier (SSID) defined under wireless LAN, to use WAN connection. Internal AP_MAC module 80 basically has a function of access controller for performing transfer control in wireless LAN. Internal AP_MAC module 80 provides MAC module 62 with an identifier (SSID) defined under wireless LAN of a dummy access point 6. Specifically, when viewed from MAC module 62, internal AP_MAC module 80 is recognized as a virtual (internal) access point, having a parallel relation with access point 6 shown in FIG. 1.

More specifically, internal AP_MAC module 80 provides MAC module 62 with a predetermined identifier (SSID) defined under wireless LAN. This is an internal process equivalent to a process of an access point 6 transmitting a beacon including the SSID of itself (as will be described later). More specifically, when a wireless connection is to be established with any access point 6 in response to a request, MAC module 62 searches for connectable access points 6 and collects usable identifiers (SSID). Internal AP_MAC module 80 provides, to MAC module 62, an identifier defined under wireless LAN, to indicate WAN base station 12 as a relay destination, as one of the collected identifiers.

Thereafter, when a connection request (an association request, described later) is internally received from MAC module 62, internal AP_MAC module 80 establishes an internal connection with MAC module 62 through a prescribed procedure in accordance with wireless LAN. When the internal connection is established, internal AP_MAC module 80 transfers the data to be transmitted, applied from MAC module 62, to WAN communication unit 70, and transfers the received data applied from WAN communication unit 70 to MAC module 62.

The data communication between MAC module 62 and internal AP_MAC module 80 is realized not through wireless connection but through wired connection.

Multiplexer 63 of wireless LAN communication unit 60 selects a module for exchanging data with MAC module 62 at each timing, from BB module 64 and internal AP_MAC module 80. More specifically, multiplexer 63 activates either a data communication path between MAC module 62 and BB module 64 or a data communication path between MAC module 62 and internal AP_MAC module 80, in accordance with a selection command issued, for example, by CPU 22. The selection command applied to multiplexer 63 may be periodically switched until connection by MAC module 62 is established. It is preferred that when MAC module 62 establishes connection with any module, information indicating the relay destination is continuously applied to multiplexer 63.

Further, since multiplexer 63 selectively mediates data communication, it is possible for MAC module 62 to simultaneously execute (in parallel) the process for obtaining SSID from access point 6 and the process for obtaining SSID from internal AP_MAC module 80. Such simultaneous execution reduces time necessary for establishing communication connection.

In this manner, MAC module 62 and multiplexer 63 provide the function of connecting to network 2 through access point 6 or WAN base station, using the identifier (SSID) defined under wireless LAN.

Because of such process, when viewed from MAC module 62, even when WAN communication unit 70 is used, connection can be established by the same procedure as when wireless LAN 60 is used. Thus, a transparent interface to WAN communication unit 70 can be provided. Specifically, MAC module 62 determines, from SSID provided by access point 6 (FIG. 2) and the SSID indicating WAN base station 12 as a relay destination provided by internal AP_MAC module 80, either access point 6 or WAN base station 12 to be the relay destination.

Typically, MAC module 62 determines whether or not there is an identifier that matches a predetermined identifier (registered list 214 shown in FIG. 6) among identifiers (SSID) of connectable access points 6 obtained through RF module 66 and BB module 64 of wireless LAN communication unit 60 and identifier (SSID) provided by internal AP_MAC module 80, and connects to network 2 through a relay destination that corresponds to the identifier matching the predetermined identifier (this process will be described later).

It is noted that between game machine 20 and access point 6, secure communication is possible. Therefore, in order for internal AP_MAC module 80 to function as a virtual access point substantially equivalent to access point 6, it is preferred that the module supports secure communication such as WEP method, WPA method and T-KIP method. Specifically, it is preferred that MAC module 62 and internal AP_MAC module 80 are configured to enable internal secure communication therebetween.

Internal AP_MAC module 80 has a register 80a for holding in advance the identifier (value of SSID) defined under wireless LAN, and the value of SSID held in register 80a is output to MAC module 62. In register 80a, a fixed SSID may be set in advance, or a value described in a program of an attached memory card 90 may be dynamically set. If the SSID is stored in advance in register 80a, it is preferred that the value is set at the time of shipment. In any case, the SSID provided from internal AP_MAC module 80 is in game machine 20.

In the example shown in FIG. 2, a plurality of SSIDs are stored in register 80a of internal AP_MAC module 80. These SSIDs are selected to have different priorities when a relay destination is selected by MAC module 62. Specifically, in the example shown in FIG. 2, register 80a holds "WAN" as the SSID having relatively low priority (priority of "L") as the relay destination, and "WAN" as the SSID having relatively high priority (priority of "H") as the relay destination. Internal AP_MAC module 80 selects one of the SSIDs held in register 80a in response to the program or a user operation (switching command), and applies it to MAC module 62, as will be described later.

Bridge 82 connects between internal AP_MAC module 80 and WAN communication unit 70 (more accurately, WAN_MAC module 72), to mediate between communication in accordance with wireless LAN and communication in accordance with WAN. Specifically, bridge 82 transmits/receives data to/from internal AP_MAC module 80 in accordance with processing procedure (protocol) of wireless LAN, and transmits/receives data to/from WAN_MAC module 72 in accordance with processing procedure (protocol) of WAN.

MAC module 62, internal AP_MAC module 80, bridge 82 and WAN_MAC module 72 may be entirely or partially implemented using a processor (typically a DSP (Digital Signal Processor)) that executes processes in accordance with programmed codes. In such a case, the program to be executed by the processor may be stored in memory card 90 or ROM 24, and at the activation of game machine 20, it may be transferred to the processor.

Specifically, memory card 90 or ROM 24 stores the connection program for connection to network 2 using the identifier (SSID) defined under wireless LAN, and the stored connection program is executed by game machine 20 as a computer, whereby the function of connection to the network is provided.

[d2. Configuration of Game Machine 10 (Current Model Machine)]

Figure 3:
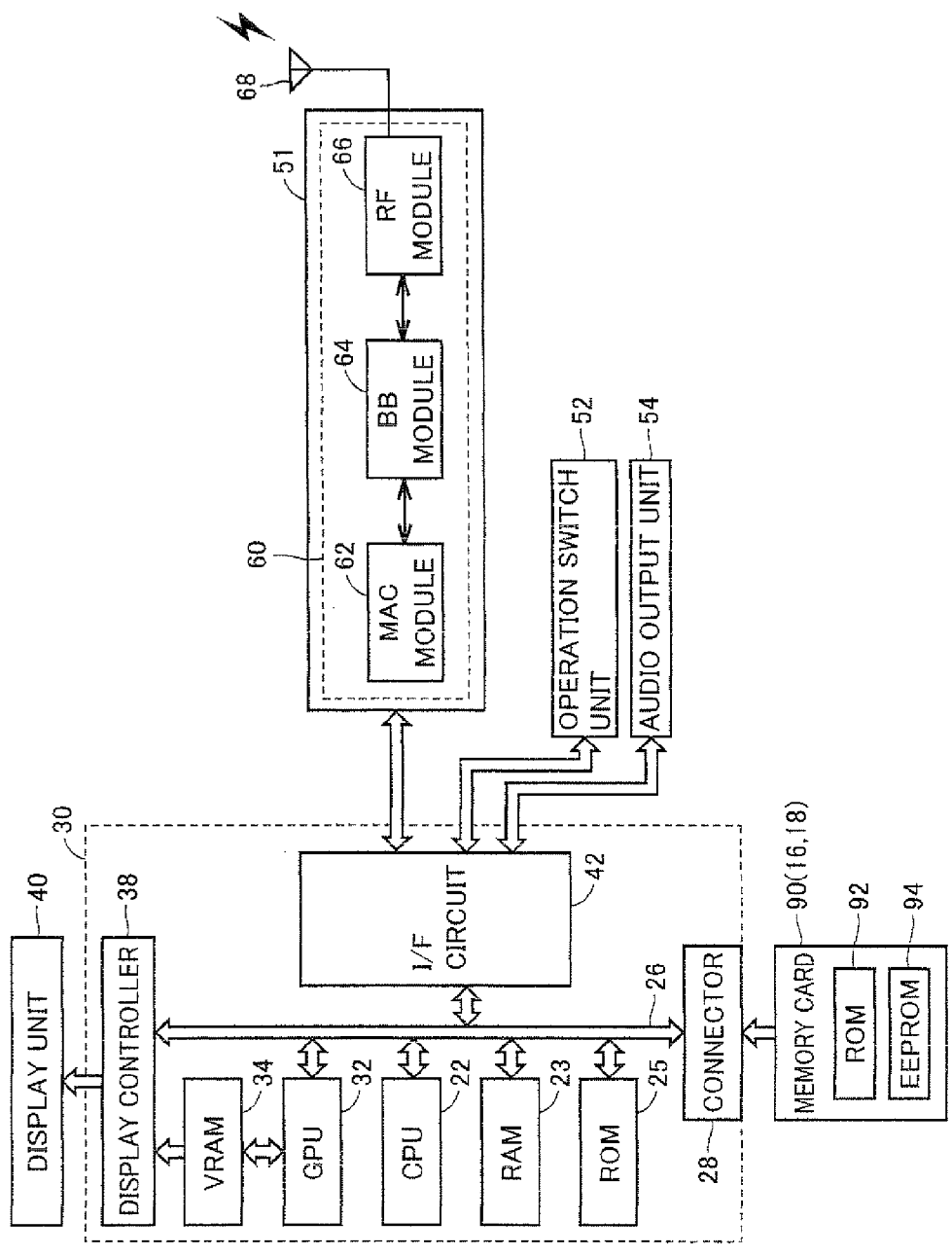
FIG. 3 is a block diagram showing a configuration of a game machine in accordance with the embodiment of the present invention.

FIG. 3 is a block diagram showing a configuration of game machine 10 in accordance with the present embodiment.

Referring to FIG. 3, game machine 10 as the current model machine is different from game machine 20 as the new model machine shown in FIG. 2 in that it includes a communication unit 51 capable only of wireless LAN communication in place of communication unit 50, and that it has an ROM 25 in which a program corresponding to communication unit 51 is fixedly held. Except for these points, the game machine is the same as game machine 20 shown in FIG. 2 and, therefore, detailed description of corresponding portions will not be repeated.

Communication unit 51 includes only a wireless LAN communication unit 60, among the components forming communication unit 50 shown in FIG. 2. MAC module 62 forming communication unit 51 may be formed by the same module as MAC module 62 forming communication unit 50 shown in FIG. 2.

Further, ROM 25 stores a boot program and a resident program of game machine 10. The resident program is executed only in game machine 10 and, therefore, basically it does not include any function for using WAN.

[d3. Configuration of Access Point 6]

Figure 4:
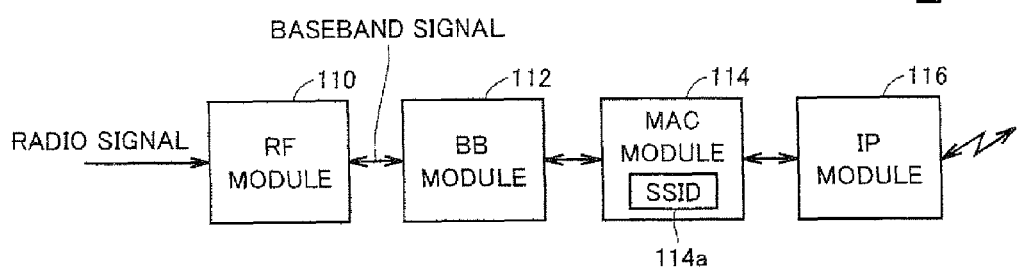
FIG. 4 is a block diagram showing a configuration of an access point in accordance with the embodiment of the present invention.

FIG. 4 is a block diagram showing a configuration of access point 6 in accordance with the embodiment of the present invention.

Referring to FIG. 4, access point 6 receives a radio signal (wireless LAN) transmitted from game machine 10 or 20 and transfers data included therein to a connection destination connected to network 2, and based on data received from the connection destination of network 2, transmits a radio signal (wireless LAN) to game machine 10 or 20. More specifically, access point 6 includes an RF module 110, a BB module 112, an MAC module 114 and an IP (Internet Protocol) module 116.

Similar to RE module 66 in wireless LAN communication unit 60 shown in FIGS. 2 and 3, RF module 110 up-converts a baseband signal received from BB module 112 to a radio signal, and down-converts a radio signal received from game machine 10 or 20 to a baseband signal.

Similar to BB module 64 in wireless LAN communication unit 60 shown in FIGS. 2 and 3, BB module 112 encodes a signal (digital data) input from MAC module 62 and generates a baseband signal (modulated signal), and decodes a baseband signal input from RE module 110 and generates a data signal.

Similar to MAC module 62 in wireless LAN communication unit 60 shown in FIGS. 2 and 3, MAC module 114 is an access controller for controlling transfer in wireless LAN with game machine 10 or 20. More specifically, receiving data from a connection destination through IP module 116, MAC module 114 divides the data to predetermined data packets and outputs to BB module 112, and couples data packets received from BB module 112 and decodes to one data block, and outputs it to IP module 116.

MAC module 114 has a register 114a for holding a value of SSID of its own access point. MAC module 114 reads the value of SSID stored in register 114a and transmits (broadcasts) a beacon having the read SSID added thereto. Specifically, MAC module 114 provides game machines 10 and 20 with the identifier (SSID) defined under wireless LAN.

IP module 116 controls data transfer to the connection destination through network 2. Specifically, IP module 116 passes the data to connection destination based on address information described at the header of data packet, in accordance with TCP/IP. Further, IP module 116 arranges data packets passed from the connection destination and outputs the resulting data packets to MAC module 114.

[d4. Configuration of WAN Base Station 12]

Figure 5:
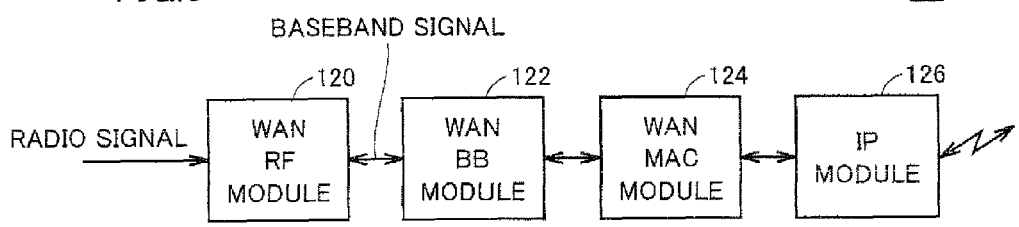
FIG. 5 is a block diagram showing a configuration of a WAN base station in accordance with the embodiment of the present invention.

FIG. 5 is a block diagram showing a configuration of WAN base station 12 in accordance with the embodiment of the present invention.

Referring to FIG. 5, WAN base station 12 receives a radio signal (WAN) transmitted from game machine 10 or 20 and transfers data included therein to a connection destination connected to network 2, and based on data received from the connection destination of network 2, transmits a radio signal (WAN) to game machine 10 or 20. More specifically, WAN base station 12 includes a WAN_RF module 120, a WAN_BB module 122, a WAN_MAC module 124, and an IP module 126.

Similar to WAN_RF module 76 in WAN communication unit 70 shown in FIG. 2, WAN_RF module 120 up-converts a baseband signal received from WAN_BB module 122 to a radio signal, and down-converts a radio signal received from game machine 10 or 20 to a baseband signal.

Similar to WAN_BB module 74 in WAN communication unit 70 shown in FIG. 2, WAN_BB module 122 encodes a signal (digital data) input from WAN_MAC module 124 and generates a baseband signal (modulated signal), and decodes a baseband signal input from WAN_RF module 120 and generates a data signal.

Similar to WAN_MAC module 72 in WAN communication unit 70 shown in FIG. 2, WAN_MAC module 124 is an access controller for controlling transfer in wireless LAN with game machine 10 or 20. More specifically, receiving data from a connection destination through IP module 126, WAN_MAC module 124 divides the data to predetermined data packets and outputs to WAN_BB module 122, and couples data packets received from WAN_BB module 122 and decodes to one data block, and outputs it to IP module 126.

Similar to IP module 116 of access point 6 shown in FIG. 4, IP module 126 controls data transfer to the connection destination through network 2.

<E. Data Structure>

Next, programs and data usable by game machines 10 and 20 in accordance with the present embodiment will be described.

Figure 6:
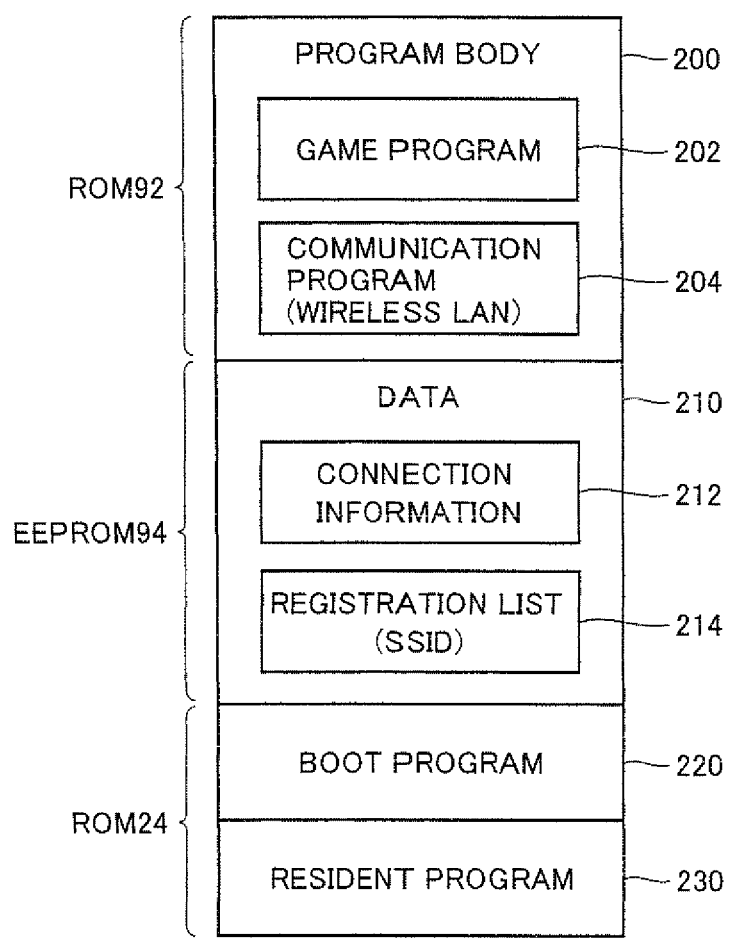
FIG. 6 is a schematic diagram structurally showing programs and data usable when a program designed only for wireless LAN is executed by a game machine (new model machine).
Figure 7:
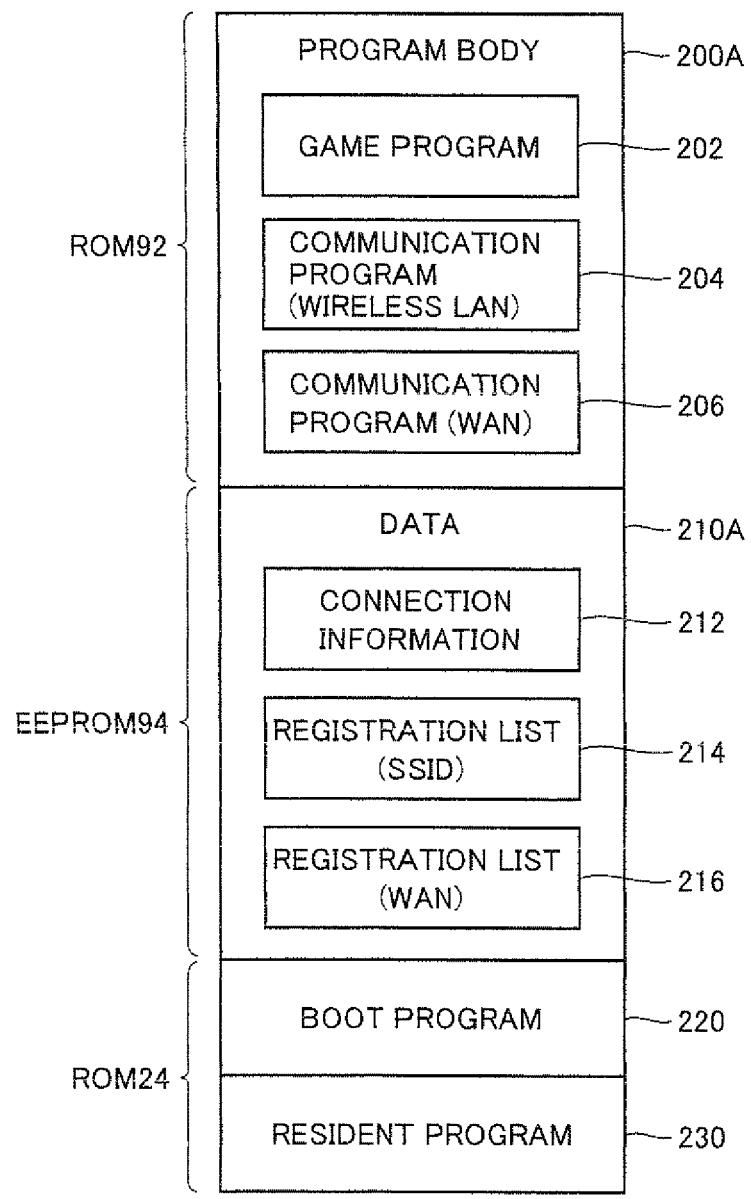
FIG. 7 is a schematic diagram structurally showing programs and data usable when a program designed for both wireless LAN and WAN is executed by a game machine (new model machine).

FIG. 6 is a schematic diagram structurally showing programs and data that can be used when a program that supports wireless LAN only is executed by game machine 20 (new model machine). FIG. 7 is a schematic diagram structurally showing programs and data that can be used when a program that supports wireless LAN and WAN is executed by game machine 20 (new model machine).

Referring to FIG. 6, ROM 92 of memory card 90 (storage medium 16) stores a program body 200. Program body 200 includes a game program 202 providing various information processing operations, and a communication program 204 for using wireless LAN communication unit 60 (FIG. 2). It is assumed that program body 200 is created considering only the current model machine, and that it does not include any communication program for using WAN communication unit 70 (FIG. 2).

Further, ROM 92 of memory card 90 (storage medium 16) stores data 210 necessary for executing game program 202. Data 210 includes connection information including past communication logs and a password, and a registration list 214 including information of relay destination. Registration list 214 includes an identifier (SSID) defined under wireless LAN, set by the user in advance as a relay destination or a candidate relay destination. The relay destination by wireless LAN is determined in accordance with the value of SSID registered in registration list 214, as will be described later.

Data 210 does not include information for directly registering WAN base station 12 as the relay destination. In place of such information, a value of SSID to indicate WAN base station 12 as the relay destination can be registered in registration list 214.

Further, ROM 24 of game machine 20 stores programs for performing basic processes even when memory card 90 is not attached. These programs correspond to a sort of OS (Operating System). Specifically, ROM 24 of game machine 20 stores a boot program 220 for performing initial operation after power-on of game machine 20, and a resident program 230 for executing processes necessary for various events after power-on. Specifically, when game machine 20 is powered on, CPU 22 performs necessary initial process in accordance with boot program 220 and, thereafter, determines whether or not any event such as a user operation has occurred as needed and executes a process required upon occurrence of an event, in accordance with resident program 230.

Referring to FIG. 7, ROM 92 of memory card 90 (storage medium 18) stores a program body 200A. Program body 200A corresponds to program body 200 shown in FIG. 6 and additionally includes a communication program 206 for using WAN communication unit 70 (FIG. 2). Specifically, program body 200A is created considering both old and new model machines, and to enable use of wireless LAN communication unit 60 (FIG. 2) and WAN communication unit 70 (FIG. 2), it includes communication programs for both.

Further, ROM 92 of memory card 90 (storage medium 18) stores data 210A. Data 210A includes, in addition to data 210 shown in FIG. 6, a registration list 216. Registration list 216 includes information for identifying a WAN base station 12 set as a relay destination or a candidate relay destination by the user. Specifically, in registration list 216, not the identifier (SSID) defined under wireless LAN but information (such as telephone number) defined under WAN connection is registered. The connection information used in WAN connection is typically stored in an SIM card (Subscriber Identity Module Card). An SIM card storing such connection information is attached to game machine 20, and as WAN_MAC module 72 accesses to the SIM card, WAN connection process is executed.

Further, the programs stored in ROM 24 of game machine 20 are the same as boot program 220 and resident program 230 shown in FIG. 6.

<F. Registration of Relay Destination>

In game machine 20, it is possible to register in advance access points 6 for wireless connection using wireless LAN. Registration of access point 6 as a relay destination is done by designating a value of corresponding SSID. The registered values of SSID are stored in EEPROM 94 of memory card 90, as registration list 214 shown in FIGS. 6 and 7.

Figure 8:
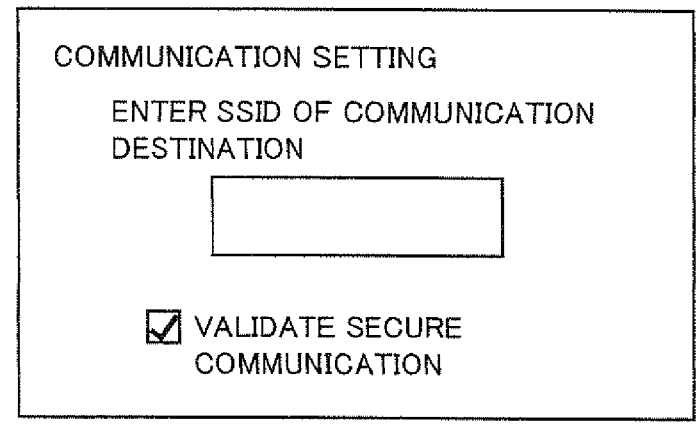
FIG. 8 shows an example of a user interface image urging registration of a relay destination, presented on the game machine in accordance with the present embodiment.

When a user registers an access point 6 to be a relay destination, a user interface image such as shown in FIG. 8 is presented. FIG. 8 shows an example of the user interface image allowing registration of relay destination, presented on game machine 20.

In the user interface image, the user inputs the value of SSID allocated to the access point 6 as the relay destination (communication destination) by, for example, operating operation switch unit 52 (FIG. 2). Wireless LAN allows secure communication in accordance with the WEP method, WPA method, T-KIP method and the like and, therefore, on the user interface image shown in FIG. 8, a check box for setting whether or not such secure communication is to be validated is displayed.

When a program designed only for wireless LAN is to be executed in game machine 20, setting for WAN use is impossible. Therefore, it follows that the user or the game to be executed registers the value of SSID indicating WAN connection, in the user interface image shown in FIG. 8.

Figure 9:
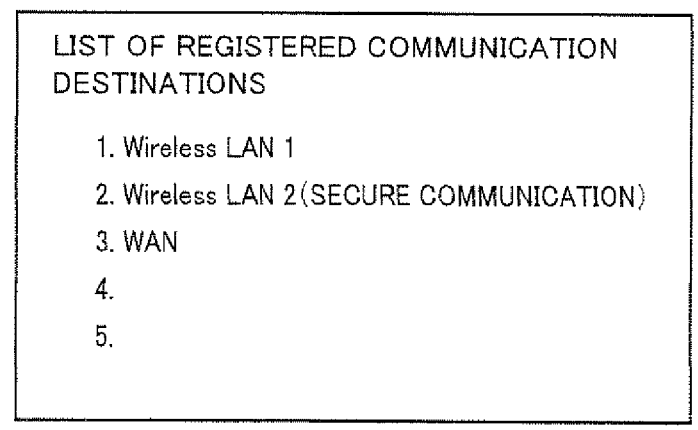
FIG. 9 shows an example of a user interface image displaying a list of registered relay destinations when a program designed for wireless LAN in accordance with the embodiment is executed by a game machine.

FIG. 9 shows an example of the user interface image displaying a list of registered relay destinations (communication destinations) when a program designed for wireless LAN in accordance with the present embodiment is executed in game machine 20. As shown in FIG. 9, in game machine 20, the list of registered SSIDs as relay destinations can be confirmed. In the example shown in FIG. 9, SSID values indicating the first to fifth relay destinations are displayed as a list in correspondence with priority of relay destinations.

It is assumed that "Wireless LAN 1" and "Wireless LAN 2" displayed on the user interface image shown in FIG. 9 represent an access point (#1) and an access point (#2) connected by using wireless LAN, respectively. Further, it is assumed that "WAN" represents WAN connection. For a relay destination for which "secure communication" is validated on FIG. 8, a display to that effect is given together with the SSID value.

In the example shown in FIG. 9, an access point (#1) connected by wireless LAN is registered to have the first priority, an access point (#2) connected by wireless LAN is registered to have the second priority, and WAN connection is registered to have the third priority. Thus, it is possible for the user to treat all relay destinations equally, without regard to the difference in communication method.

Next, for comparison, a user interface image when a program designed for both wireless LAN and WAN is executed by game machine 20 will be described.

Figure 10:
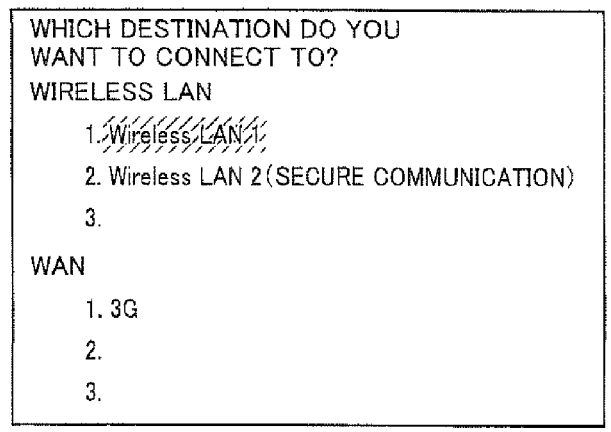
FIG. 10 shows an example of a user interface image displaying a list of registered relay destinations when a program designed for wireless LAN and WAN in accordance with the embodiment is executed by a game machine.

FIG. 10 shows an example of the user interface image displaying a list of registered relay destinations (communication destinations) when a program designed for wireless LAN and WAN in accordance with the present embodiment is executed in game machine 20. As shown in FIG. 10, when a program designed for wireless LAN and WAN is executed, wireless LAN and WAN can be displayed distinguished from each other.

Specifically, based on registration list 214 included in data 210A shown in FIG. 7, candidate relay destinations for wireless LAN are displayed as a list, and based on registration list 216, candidate relay destinations for WAN are displayed as a list. The user interface image shown in FIG. 10 allows the user to arbitrary select the relay destination. Alternatively, priority of relay destinations may be set in the user interface image shown in FIG. 10. In that case, in response to a request for connection, a relay destination is automatically selected in accordance with the set priority.

As an alternative example, SSIDs for identifying relay destination in accordance with wireless LAN and relay destination in accordance with WAN may be registered in advance, instead of the registration of arbitrary SSIDs by the user in the manner as described above. Such SSIDs may be set at the time of shipment of the products. In that case, since game machine 20 can use both wireless LAN and WAN, when a user requests connection to a network, it is possible to successively search for a connectable relay destination in accordance with a predetermined order.

Typically, a manner of use is possible in which wireless LAN is used as main communication means and WAN connection is used as sub communication means. In this case, first, any access point having the SSID registered in advance as a relay destination in accordance with wireless LAN is searched for, and if no such access point can be found, WAN connection is validated.

Figure 11A:
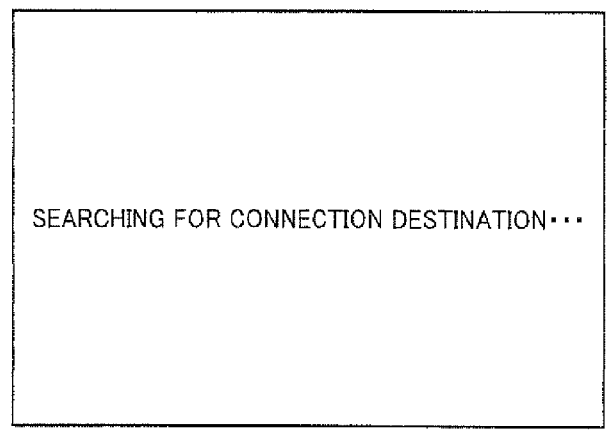
FIGS. 11A and 11B show modifications of the user interface images displayed during a connecting process provided by a game machine when a program designed for wireless LAN and WAN in accordance with the embodiment is executed.
Figure 11B:
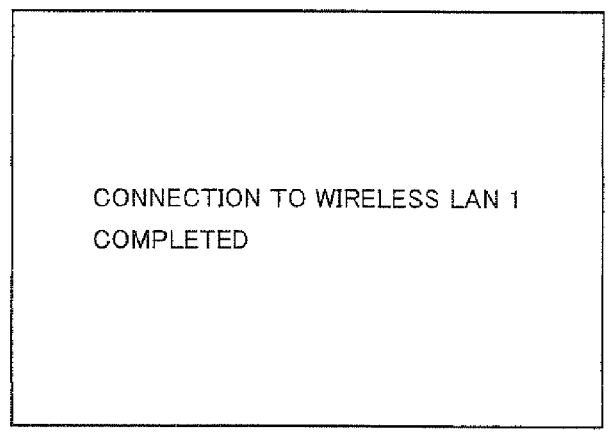

FIGS. 11A and 11B show modifications of the user interface image displayed during execution of a connection process, when a program designed for both wireless LAN and WAN is executed by game machine 20 in accordance with the present embodiment. When SSIDs for wireless LAN and WAN are registered in advance as described above and the user requests a connection to the network, a user interface image such as shown in FIG. 11A is displayed, and in game machine 20, a searching process for the relay destination (connection destination) is executed. When connection is established to any relay destination in accordance with wireless LAN or WAN, a user interface such as shown in FIG. 11B is displayed. On the user interface image shown in FIG. 11B, the SSID of relay destination with which connection is established may be displayed.

<G. Communication Process>

Next, referring to FIGS. 12 to 14, a communication process when the game machine is connected to network 2 using wireless communication will be described.

(G1. Communication Sequence when Wireless LAN Only is Available>

FIG. 12 shows a communication sequence when game machine 10 in accordance with the embodiment of the present invention uses wireless LAN connection. The communication sequence shown in FIG. 12 is executed by game machine 10 that can use wireless LAN only. Specifically, it corresponds to a communication process executed by an application not expecting WAN connection. It is noted that the communication sequence shown in FIG. 12 is similarly executed when storage medium 18 storing program body 200A including communication program 206 (FIG. 7) for using WAN connection is executed by game machine 10.

The sequence of FIG. 12 shows an example in which game machine 10 (mainly, CPU 22 and MAC module 62) exists in service coverage of two access points 6 (#1 and #2).

Referring to FIG. 12, when any connection start event occurs (sequence SQ200) in game machine 10, game machine 10 executes a SCAN process, to search for a connectable access point 6 (sequence SQ202). More specifically, game machine 10 waits for a beacon from any of the access points 6, for a prescribed period. Each beacon includes the SSID allocated to access point 6 as the source of transmission of the beacon. Each access point 6 transmits (broadcasts) the beacon periodically, or when any request is received.

Assume that, at this time, access point 6 (#1) having the SSID of "WirelessLAN1" transmits a beacon (sequence SQ204-1) and access point 6 (#2) having the SSID of "WirelessLAN2" transmits a beacon (sequence SQ204-2). Receiving these beacons, game machine 10 determines that the two access points 6 (network) having SSIDs of "WirelessLAN1" and "WirelessLAN2," respectively, are available. Specifically, game machine 10 obtains identifiers (SSIDs) of access points 6 connectable by wireless LAN.

Thereafter, game machine 10 determines a relay destination for connection to network 2, from the obtained SSIDs (sequence SQ206). Specifically, game machine 10 connects to network 2 through the relay destination that corresponds to any of the obtained identifiers (SSIDs). Typically, game machine 10 looks up to the contents of registration list 214 such as shown in FIG. 9 and determines whether or not there is an access point 6 having the SSID matching the SSID registered in registration list 214. Then, it determines the access point 6 having the SSID registered in registration list 214 to be the relay destination.

The process for determining the relay destination of sequence SQ206 is, in other words, a process for determining the connection destination or communication destination.

After the access point 6 to be the relay destination is determined, game machine 10 designates the SSID of the determined access point 6, and transmits an association request (connection request) (sequence SQ208). FIG. 12 shows an example in which access point 6 (#1) is determined to be the relay destination. If the situation allows connection to game machine 10 (if available channel exists), the access point 6 (#1) that received the association request transmits an association response (connection possible response) to game machine 10 (sequence SQ210). Then, negotiation in accordance with wireless LAN protocol is executed between game machine 10 and access point 6 (#1), and connection by wireless LAN is established therebetween (sequence SQ212).

After the connection by wireless LAN is established, various data are exchanged (transmitted/received) between game machine 10 and access point 6 (#1) (sequence SQ214).

Assume that a disconnection event occurs thereafter in game machine 10 (sequence SQ216). Typically, end of an application that is being executed in game machine 10 is instructed. Then, in order to cut off the connection by wireless LAN that is currently established, game machine 10 transmits a disassociation request (disconnection request) to access point 6 (#1) as the relay destination (sequence SQ218). Then, wireless connection between game machine 10 and access point 6 (#1) is cut off. It is preferred that the disconnection process of wireless connection is executed before ending an application.

Through the communication process described above, game machine 10 can connect to network 2 using wireless LAN.

(g2. Communication Sequence when Wireless LAN and WAN are Available)

Next, a communication sequence for game machine 20 that can use wireless LAN and WAN will be described.

Figure 13:
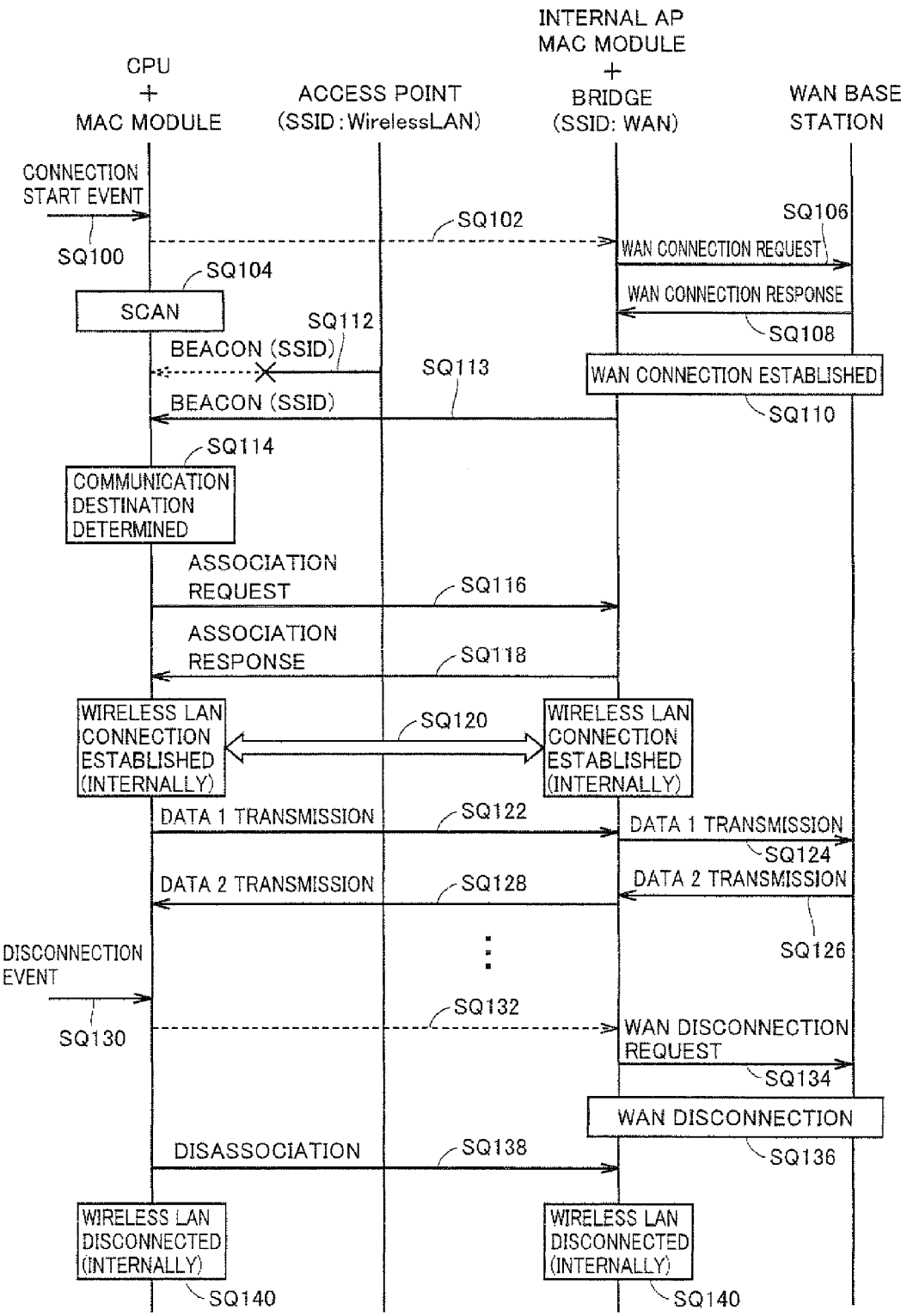
FIG. 13 shows a communication sequence when WAN connection is used in the game machine in accordance with the embodiment of the present invention.

FIG. 13 shows a communication sequence when game machine 20 in accordance with an embodiment of the present invention uses WAN connection. FIG. 14 shows a communication sequence when game machine 20 in accordance with an embodiment of the present invention uses wireless LAN connection. It is assumed that, in FIGS. 13 and 14, game machine 20 can use both wireless LAN and WAN. With this assumption, the sequence of FIG. 13 shows an example when game machine 20 validates WAN connection, and the sequence of FIG. 14 shows an example when game machine 20 validates wireless LAN connection.

Figure 14:
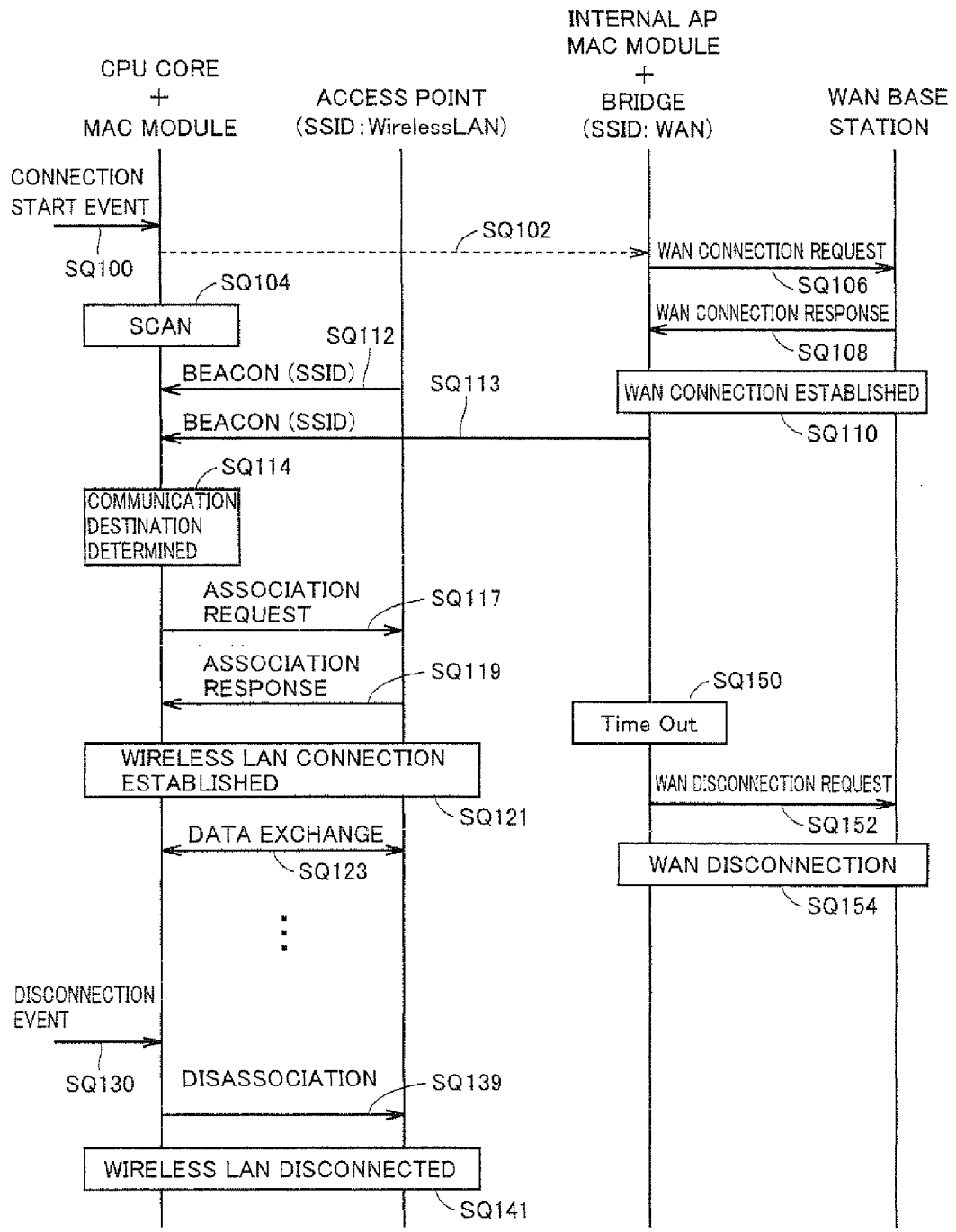
FIG. 14 shows a communication sequence when wireless LAN connection is used in the game machine in accordance with the embodiment of the present invention.

In the communication sequences shown in FIGS. 13 and 14, it is assumed that wireless LAN connection has higher priority than WAN connection. This is because, in the expected manner of use of game machine 20, wireless LAN is used as main communication means and WAN connection is used complementarily, only when wireless LAN connection is unavailable.

Specifically, if no SSID from access point 6 is obtained while an SSID is provided from internal AP_MAC module 80, WAN connection is validated for connection to the network.

In the sequences shown in FIGS. 13 and 14, for easier understanding of the process procedure, communications among CPU 22 and MAC module 62 functioning as the relay destination determining unit, access point 6 connectable by wireless LAN, internal AP_MAC module 80 and bridge 82 functioning as an access controller of a dummy access point, and WAN base station 12 will be described as an example.

CPU 22 exchanges data using SSID, to/from MAC module 62. Specifically, CPU 22 exchanges data with MAC module 62 in accordance with a protocol defined under wireless LAN connection. Therefore, when viewed from CPU 22, every communication means can be handled as communication means in accordance with wireless LAN connection, and no special process is required for the WAN connection.

(i) Connection to Network 2 by WAN Connection

FIG. 13 shows, as an example, a sequence when no SSID can be obtained from access point 6.

First, in game machine 20, CPU 22 and MAC module 62 detect any connection start event (sequence SQ100) and then, CPU 22 and MAC module 62 notify internal AP_MAC module 80 of the occurrence of connection start event (sequence SQ102).

Then, CPU 22 and MAC module 62 execute a SCAN process to search for a connectable access point 6 (sequence SQ104). More specifically, game machine 20 waits for a beacon from any of the access points 6, for a prescribed period. Each beacon includes the SSID allocated to access point 6 as the source of transmission of the beacon. Each access point 6 transmits (broadcasts) the beacon periodically, or when any request is received.

Specifically, the process for obtaining the SSID in accordance with wireless LAN connection may be realized through active scan or passive scan.

At this time, assume that an access point 6 having the SSID of "WirelessLAN" transmits a beacon (sequence SQ112). In parallel therewith, internal AP_MAC module 80 functioning as an access controller of a dummy access point internally transmits a beacon including the SSID held in register 80a (sequence SQ113). It is assumed that the SSID of "WAN" is stored in register 80a.

Receiving these beacons, CPU 22 and MAC module 62 can determine that access points (actual access point 6 and dummy access point) having SSIDs of "WirelessLAN" and "WAN", respectively, can be used. Specifically, game machine 20 obtains an identifier (SSID) of an access point 6 that is connectable by wireless LAN, and receives an identifier (SSID) defined under wireless LAN for indicating WAN as a relay destination.

In the example shown in FIG. 13, it is assumed that reception of the beacon transmitted from access point 6 having the SSID of "WirelessLAN" failed (sequence SQ112).

Thereafter, game machine 20 determines the relay destination for connection to network 2, from the searched out SSIDs (sequence SQ114). Specifically, CPU 22 and MAC module 62 connect to network 2 through a relay destination that corresponds to either the obtained SSID indicating a connectable access point 6 or the SSID indicating WAN as a relay destination provided by internal AP_MAC module 80. The method of determining the relay destination used for connection to network 2 will be described later. In the example shown in FIG. 13, reception of SSID from connectable access point 6 is failed at sequence SQ112 and, therefore, game machine 20 determines that there is no connectable access point 6. Then, game machine 20 determines WAN (SSID: WAN) to be the relay destination.

After the start of obtaining identifiers (SSIDs) of access points 6 connectable by wireless LAN, a process for establishing connection with WAN base station 12 in accordance with WAN starts. The reason for this is that for game machine 20 to use WAN connection, both internal connection between MAC module 62 and internal AP_MAC module 80 and wireless connection between WAN communication unit 70 (WAN_MAC module 72) and WAN base station 12 (WAN_MAC module 124) must be established. By executing two connecting processes in parallel, the time required before starting wireless access can be reduced.

More specifically, detecting occurrence of a connection start event, internal AP_MAC module 80 instructs WAN_MAC module 72 to start WAN connection, through bridge 82. Specifically, internal AP_MAC module 80, bridge 82 and WAN_MAC module 72 transmit a WAN connection request to WAN base station 12 as the relay destination (sequence SQ106). Receiving the WAN connection request, if the situation allows connection to game machine 20, WAN base station 12 transmits a WAN connection response to game machine 20 (sequence SQ108). Then, negotiations in accordance with WAN protocol are executed, and connection in accordance with WAN is established between the two (sequence SQ110). Even when WAN connection is established between game machine 20 and WAN base station 12, basically, data exchange (transmission/reception) between the two is not performed until WAN is selected as the relay destination.

Thereafter, the relay destination is determined, and CPU 22 and MAC module 62 transmit an association request (connection request), designating the SSID corresponding to the determined relay destination (sequence SQ116).

As described above, FIG. 12 shows an example in which WAN (SSID: WAN) is determined to be the relay destination. Therefore, CPU 22 and MAC module 62 transmit the association request to internal AP_MAC module 80. Receiving the association request, if the situation allows connection to game machine 20, internal AP_MAC 80 transmits an association response (connection possible response) to CPU 22 and MAC module 62 (sequence SQ118). Then, negotiations in accordance with wireless LAN protocol are executed between CPU 22 and MAC module 62 and internal AP_MAC module 80, and connection is established therebetween by dummy (internal) wireless LAN (sequence SQ120).

When connection by dummy wireless LAN is established, connection of game machine 20 to network 2 using WAN becomes possible. By way of example, when CPU 22 and MAC module 62 transmit data 1 (sequence SQ122), internal AP_MAC module 80 receives data 1, and bridge 82 and WAN_MAC module 72 transmit data 1 to WAN base station 12 (sequence SQ124). On the other hand, when WAN base station 12 transmits data 2 (sequence SQ126), WAN_MAC module 72, bridge 82 and internal AP_MAC module 80 transmit received data 2 to MAC module 62 and CPU 22 (sequence SQ128).

Thereafter, in the similar manner, sequences SQ122 to SQ128 are repeated, whereby various data are exchanged between game machine 20 and WAN base station 12.

Assume that a disconnection event occurs thereafter in game machine 20 (sequence SQ130). Typically, end of an application that is being executed in game machine 20 is instructed. CPU 22 and MAC module 62 notify internal AP_MAC module 80 of the occurrence of disconnection event (sequence SQ132).

Detecting the occurrence of a disconnection event, internal AP_MAC module 80 instructs WAN_MAC module 72 to cut off WAN connection, through bridge 82. Specifically, internal AP_MAC module 80, bridge 82 and WAN_MAC module 72 transmit a WAN disconnection request to WAN base station 12 as the relay destination in accordance with WAN (sequence SQ134). Then, WAN connection between game machine 20 and WAN base station 12 is cut off (sequence SQ136).

In parallel with the WAN disconnecting process, CPU 22 and MAC module 62 transmits a disassociation request (disconnection request) to internal AP_MAC module 80, to cut off dummy (internal) wireless LAN connection that has been established with internal AP_MAC module 80 (sequence SQ138). Then, dummy wireless LAN between MAC module 62 and internal AP_MAC module 80 is cut off.

It is preferred that the series of disconnection processes described above is executed before ending an application.

(ii) Connection to Network 2 by Wireless LAN Connection

Next, a process for connection to network 2 by wireless LAN will be described with reference to FIG. 14.

Of the process procedure shown in FIG. 14, the process from sequence SQ100 to SQ114 is the same as the process from sequence SQ100 to SQ114 shown in FIG. 13. At sequence SQ114, when access point 6 is determined to be the relay destination, CPU 22 and MAC module 62 designate the SSID corresponding to the determined access point 6 and transmit an association request (connection request) (sequence SQ117). Receiving the association request, if the situation allows connection to game machine 20, access point 6 transmits an association response (connection possible response) to game machine 20 (sequence SQ119). Then, negotiations in accordance with wireless LAN protocol are executed between game machine 20 and access point 6, and connection by wireless LAN is established between the two (sequence SQ121). After the connection by wireless LAN is established, various data are exchanged (transmitted/received) between game machine 20 and access point 6 (sequence SQ123).

On the other hand, in the example of communication process shown in FIG. 14, in parallel with the process for establishing connection by wireless LAN, a process for establishing connection by WAN is executed. If an access point 6 in accordance with wireless LAN is determined to be the relay destination, however, this connection by WAN becomes unnecessary and, therefore, at the time point when maintenance of WAN connection is determined to be unnecessary, WAN disconnecting process is executed.

Specifically, after WAN connection is established (after completion of sequence SQ110), internal AP_MAC module 80 waits for a prescribed time period until internal connection between MAC module 62 and internal AP_MAC module 80 is established. If the internal connection between MAC module 62 and internal AP_MAC module 80 is not established after the lapse of the prescribed time period, it is determined that not the WAN connection but wireless LAN connection is selected. Specifically, when time out occurs before establishment of internal connection between MAC module 62 and internal AP_MAC module 80 (sequence SQ150), internal AP_MAC module 80 instructs WAN_MAC module 72 to disconnect WAN connection, through bridge 82. Specifically, internal AP_MAC module 80, bridge 82 and WAN_MAC module 72 transmit a WAN disconnection request to WAN base station 12 as the relay destination of WAN (sequence SQ152). Then, WAN connection between game machine 20 and WAN base station 120 is cut off (sequence SQ154).

Assume that a disconnection event occurs thereafter in game machine 20 (sequence SQ130). Typically, end of an application that is being executed in game machine 20 is instructed.

Detecting the occurrence of a disconnection event, in order to cut off the connection by wireless LAN that is currently established, CPU 22 and MAC module 62 transmits a disassociation request (disconnection request) to access point 6 as a relay destination (sequence SQ139). Then, wireless connection between game machine 20 and access point 6 is cut off (sequence S141).

It is preferred that the series of disconnection processes described above is executed before ending an application.

In the communication process shown in FIGS. 13 and 14 above, an example has been described in which WAN connection is established no matter whether WAN connection is actually used or not, in order to enable WAN connection more quickly after receiving a connection request. The process may be executed as needed after the relay destination is determined. Specifically, the process steps of sequence SQ106 to SQ110 may be started after execution of sequence SQ120.

Further, in the communication process shown in FIG. 14, an example has been described in which WAN connection is disconnected when time out occurs. The process of disconnecting WAN connection may be executed, or the process of establishing WAN connection may be stopped, when an access point is determined to be the relay destination.

<H. Priority Management Process>

Game machine 20 in accordance with the present embodiment can use both wireless LAN and WAN. It would be more user friendly, if setting is possible as to which of wireless LAN and WAN is used with priority. Specifically, game machine 20 is connectable to network 2 through a relay destination corresponding to the identifier (SSID) of higher priority. At this time, game machine 20 also provides a function of changing the priority regarding the relay destination. In the following, the process of managing priority will be described.

(i) Change of Priority on Registration List

On registration list 214 shown in FIG. 6, if SSIDs of access points 6 for connection by wireless LAN and the SSID indicating WAN are treated equally to set the priority, it is possible to set either one of wireless LAN and WAN with priority, by updating the contents of registration list 214. Specifically, as shown in FIG. 9, based on the priority set for each identifier (SSID) defined under wireless LAN, MAC module 62 determines either access point 6 or WAN base station 12 to be the relay destination. By way of example, in FIG. 9, if the entry "WAN" is positioned at the highest rank (position of highest priority), WAN connection is done with priority. If the entry "WAN" is positioned at the lowest rank (position of lowest priority), wireless LAN connection is done with priority.

The process for updating the contents of registration list 214 may be done in accordance with a user operation, or may be done linked with a set value of an application.

(ii) Change of SSID Allocated to Internal AP_MAC Module

It is also possible to store a plurality of SSIDs having different priorities in register 80a of internal AP_MAC module 80 shown in FIG. 2, and to switch the value of SSID provided by internal AP_MAC module 80 to MAC module 62 in accordance with a request for changing priority.

More specifically, as the priority for selection to be the relay destination, "WAN2">SSID other than "WAN2" and "WAN">"WAN" is set. When the priority "H" is applied, internal AP_MAC module 80 provides MAC module 62 with "WAN2" stored in register 80a, and if the priority "L" is applied, internal AP_MAC module 80 provides MAC module 62 with "WAN" stored in register 80a. Specifically, if priority "H" is set, internal AP_MAC module 80 provides "WAN2" as the SSID having the highest priority set, and hence, WAN connection is selected with priority. On the contrary, if priority "L" is set, internal AP_MAC module 80 provides "WAN" as the SSID having the lowest priority set, and hence, wireless LAN is selected with priority.

Figures 15, 16:
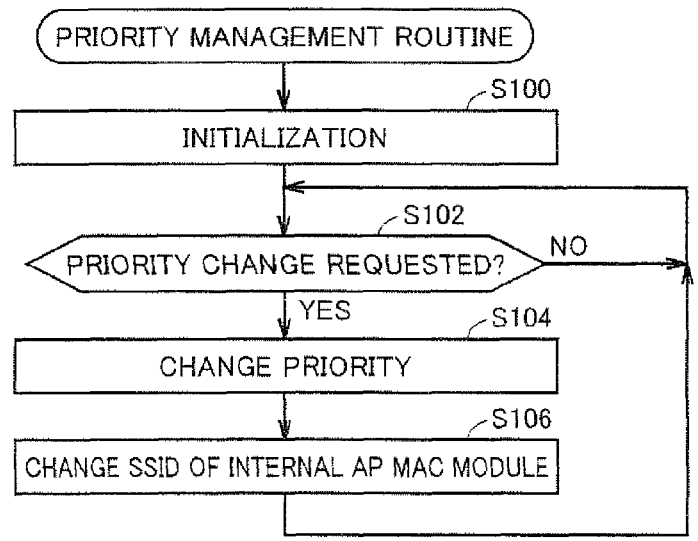
FIG. 15 shows an example of a user interface image allowing change of priority of relay destinations, presented on the game machine in accordance with the embodiment of the present invention.
FIG. 16 is a flowchart representing process procedure of priority management, provided in the game machine in accordance with the embodiment of the present invention.

FIG. 15 shows an example of a user interface image on which the priority regarding relay destination can be changed, presented on game machine 20 in accordance with the embodiment of the present invention.

The user interface image shown in FIG. 15 corresponds to the user interface image for registering SSID of relay destination shown in FIG. 8, and it additionally has a check box of "WAN CONNECTED WITH PRIORITY IF AVAILABLE." When the user registers an SSID of a relay destination used for wireless connection, if he/she validates this check box, internal AP_MAC module 80 comes to have the priority "H". As a result, internal AP_MAC module 80 comes to provide MAC module 62 with "WAN2" stored in register 80a.

In addition to the user setting on the user interface image described above, the priority may be set by the following methods.

(a) When a specific application is executed in game machine 20, an instruction to set the priority is automatically issued to internal AP_MAC module 80.

(b) During execution of an application in game machine 20, upon a specific operation by the user, an instruction to set the priority is automatically issued in internal AP_MAC module 80.

(c) By boot program 220 shown in FIG. 6 or FIG. 7, at the time of power-on, an instruction to set the priority is issued to internal AP_MAC module 80.

The process of priority management described above can be generally represented by the flowchart of FIG. 16

FIG. 16 is a flowchart representing the process procedure of priority management process provided by game machine 20 in accordance with the embodiment of the present invention. Steps shown in FIG. 16 are typically realized by CPU 22 executing instructions in accordance with resident program 230 (FIG. 6 or FIG. 7).

First, when game machine 20 is powered on, CPU 22 executes an initialization process (step S100). The initialization process includes (a) setting of a plurality of SSIDs having different priorities in register 80a of internal AP_MAC module 80, (b) setting of priority in internal AP_MAC module 80, and (c) reading of SSID list set in registration list 214 (FIG. 6).

The SSID set in register 80a of internal AP_MAC module 80 is the identifier (SSID) defined under wireless LAN for indicating WAN base station 12 as a relay destination, and it may be defined in program body 200. In that case, the identifier (SSID) defined in program body 200 is validated when program body 200 is executed by game machine 20 supporting wireless LAN and WAN.

Thereafter, at step S102, CPU 22 determines whether or not a request for changing priority is received. The request for changing priority may be given when the user instructs change of priority, or it may be automatically issued by an application executed by CPU 22, as described above. If the request for changing priority is not received (NO at step S102), the process of step S102 is repeated.

On the other hand, if the request for changing priority is received (YES at S102), CPU 22 changes the priority in accordance with the request for changing the priority (step S104). By way of example, CPU 22 sets new priority for internal AP_MAC module 80, as described above. Then, at step S106, internal AP_MAC module 80 provides MAC module 62 with the SSID that corresponds to the new priority, from the plurality of SSIDs stored in register 80a. Then, the process following step S102 is repeated.

<J. Overall Process>

Figure 17:
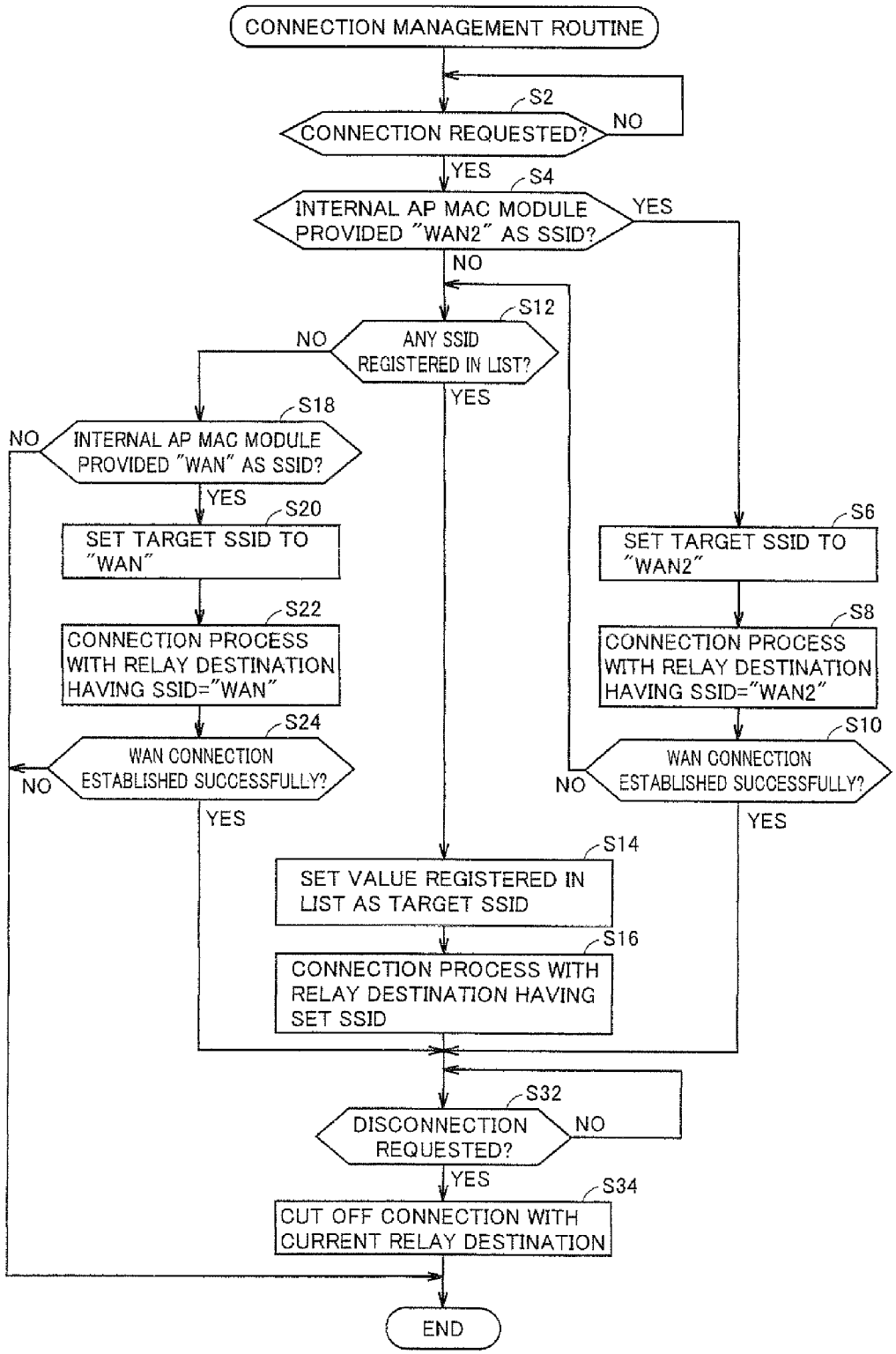
FIG. 17 is a flowchart representing process procedure of connection management, provided in the game machine in accordance with the embodiment of the present invention.

FIG. 17 is a flowchart representing process procedure of connection management provided by game machine 20 in accordance with the embodiment of the present invention. Typically, each step shown in FIG. 17 is realized by communication program 204 (FIG. 6 or FIG. 7) or by a cooperation of communication program 204 and resident program 230 (FIG. 6 or FIG. 7).

Referring to FIG. 17, first, at step S2, CPU 22 determines whether or not a request for connection to the network is received. Specifically, CPU 22 determines whether or not an access request to network 2 is issued, for example, from the application that is being executed. Alternatively, CPU 22 determines whether or not the user requested use of network 2. If the request for connection to the network is not received (NO at step S2), CPU 22 repeats the process of step S2.

If the request for connection to the network is received (YES at step S2), the process proceeds to S4.

At step S4, CPU 22 determines whether internal AP_MAC module 80 provides MAC module 62 with "WAN2" as the SSID. Specifically, whether the priority "H" is set for internal AP_MAC module 82 or not is determined.

If internal AP_MAC module 80 provides MAC module 62 with "WAN2" as the SSID (YES at S4), the process proceeds to step S6. On the other hand, if internal AP_MAC module 80 does not provide MAC module 62 with "WAN2" as the SSID (NO at step S4), the process proceeds to step S12.

Specifically, if use of WAN connection with higher priority than wireless LAN is set, a process for realizing WAN connection with priority is executed as represented by the following steps S6 to S10. On the other hand, if use of WAN connection with priority is not set, the relay destination is determined in accordance with the registered contents of registration list 214.

At step S6, CPU 22 sets the target SSID to "WAN2". Specifically, CPU 22 determines an access point (actually, internal AP_MAC module 80 as the dummy access point) of which SSID matches "WAN2" to be the relay destination. Thereafter, at step S8, CPU 22 tries connection to the relay destination having the SSID="WAN2".

Then, at step S10, CPU 22 determines whether or not the WAN connection has been successfully established. If WAN connection is successfully established (YES at step S10), the process proceeds to step S32, and if WAN connection failed (NO at step S10), the process proceeds to step S12. That the WAN connection is established means CPU 22 cooperated with MAC module 62 to establish dummy wireless LAN connection to internal AP_MAC module 80.

At step S12, CPU 22 determines, with reference to registration list 214, whether any SSID has been registered in the list. Specifically, whether or not a relay destination is set in advance by a user or an application is determined. If any SSID has been registered in the list (YES at step S12), the process proceeds to step S14, and if no SSID is registered in the list (NO at step S12), the process proceeds to step S18.

At step S14, CPU 22 sets the value (SSID) registered in the list as the target SSID. If a plurality of SSIDs are registered in registration list 214, the SSID having the highest priority (listed at the top) is determined to be the relay destination. Thereafter, at step S16, CPU 22 executes the connection process to the relay destination having the set target SSID. Then, the process proceeds to step S32.

Specifically, at steps S14 and S16, CPU 22 and/or MAC module 62 determines whether or not there is any identifier (SSID) that matches a predetermined identifier, among the identifiers obtained from access points. Then, MAC module 62 connects to network 2 through the relay destination corresponding to the SSID that matches the predetermined identifier.

If connection cannot be established with the relay destination having a certain SSID registered in registration list 214, connection process to the relay destination registered to have the next highest priority in registration list 214 is executed. Specifically, CPU 22 and/or MAC module 62 connects to network 2 through the relay destination having the identifier of higher priority, based on the predetermined priority.

Basically, at steps S14 and S16, wireless LAN connection is established to any of the access points 6. If wireless LAN connection cannot be established with any of the access points 6, however, trial may be made to establish WAN connection, as represented by steps S18 to S24.

At step S18, CPU 22 determines whether or not internal AP_MAC module 80 provides MAC module 62 with "WAN" as the SSID. Specifically, that the step S18 is executed means that no SSID is registered as the relay destination in registration list 214, or that wireless LAN connection could not be established to any access point 6. In that case, WAN connection is tried.

If internal AP_MAC module 80 provides MAC module 62 with "WAN" as the SSID (YES at step S18), the process proceeds to step S20. On the other hand, if internal AP_MAC module 80 does not provide MAC module 62 with "WAN" as the SSID (NO at step S18), the process ends.

At step S20, CPU 22 sets the target SSID to "WAN". Specifically, CPU 22 determines the access point (actually, internal AP_MAC module 80 as a dummy access point) of which SSID matches "WAN" to be the relay destination. Thereafter, at step S22, CPU 22 tries to establish connection to the relay destination having the SSID="WAN".

Thereafter, at step S24, CPU 22 determines whether the WAN connection has been successfully established. If the WAN connection is successfully established (YES at step S24), the process proceeds to step S32, and if the WAN connection fails (NO at step S24), the process ends.

At step S32, CPU 22 determines whether or not a request for disconnecting network connection is received. Specifically, CPU 22 determines whether the application that is being executed or the user instructed to cut off connection to network 2. If a request for disconnecting network connection is not received (NO at step S32), CPU 22 repeats the process of step S32. If a request for disconnecting network connection is received (YES at step S32), CPU cuts off connection to the present relay destination (step S34), and the process ends.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing system, comprising:
a first connection control device and a second connection control device connected to a network; and
an information processing apparatus configured to:
connect to the network through said first connection control device via a first communication method; and
connect to the network through said second connection control device via a second communication method, different from the first communication method,
wherein said first connection control device includes a first providing unit configured to provide said information processing apparatus with a first identifier defined under said first communication method;
said information processing apparatus includes:
a relay destination determining unit configured to determine said first connection control device to be a relay destination for connection to said network, based on the first identifier provided by said first providing unit;
a second providing unit configured to provide said relay destination determining unit with a second identifier defined under said first communication method for indicating said second connection control device to be the relay destination; and
a connecting unit configured to establish a connection to said network through said second connection control device via the second communication method by using the second identifier defined under said first communication method,
wherein said relay destination determining unit is operative to determine said second connection control device to be the relay destination based on provision of the second identifier provided by said second providing unit.

2. An information processing apparatus for communicatively connecting by a first communication method to a first connection control device and communicatively connecting by a second communication method to a second connection control device, the first communication method being different from the second communication method, the information processing apparatus comprising:
an obtaining unit configured to obtain a first identifier from said first connection control device, the first identifier defined in accordance with said first communication method;
a relay destination determining unit configured to determine that said first connection control device is to be a relay destination for connection to a network, based on the first identifier obtained by said obtaining unit;
a providing unit configured to provide said relay destination determining unit with a second identifier defined in accordance with said first communication method, the second identifier indicating said second connection control device to be the relay destination for connection to the network based at least in part on the second communication method; and
a connecting unit configured to establish a connection to said network through said second connection control device via the second communication method by using the second identifier defined under said first communication method, wherein said relay destination determining unit is further configured to determine the second connection control device to be the relay destination for connection to the a network based in accordance with provision of the second identifier provided by said providing unit.

3. The information processing apparatus according to claim 2, wherein
said providing unit includes a holding unit configured to hold, in advance, the second identifier; and
said providing unit is configured to provide said relay destination determining unit with the second identifier held by said holding unit.

4. The information processing apparatus according to claim 2, further comprising:
a storage unit configured to store a connection program for connecting to the network using the second identifier defined under said first communication method;
wherein the connection program stored in said storage unit instructs a computer of said information processing apparatus to have said connecting unit connect to said network.

5. The information processing apparatus according to claim 2, wherein
if said obtaining unit fails to obtain the first identifier and said providing unit provides the second identifier, said relay destination determining unit determines said second connection control device to be the relay destination based on the second identifier provided by said providing unit.

6. The information processing apparatus according to claim 2, further comprising:
a determining unit for performing a determination whether the first identifier obtained by said obtaining unit or the second identifier provided by said providing unit matches a predetermined identifier; wherein
said relay destination determining unit determines the relay destination based on the determination made by the determining unit.

7. The information processing apparatus according to claim 2, wherein
said relay destination determining unit is configured to determine any of said first connection control device and said second connection control device to be the relay destination, based on a priority set for each identifier of a plurality of identifiers that are defined under said first communication method, the plurality of identifiers including the first identifier and the second identifier.

8. The information processing apparatus according to claim 7, wherein
said relay destination determining unit is further configured to change said priority.

9. The information processing apparatus according to claim 7, wherein said providing unit includes:
a storage medium configured to hold the plurality of identifiers with corresponding priorities different from each other, and
a logic for selecting and providing to said relay destination determining unit one of said plurality of identifiers.

10. The information processing unit according to claim 2, further comprising
a connection establishment starting unit that is configured to, after said obtaining unit begins to obtain the first identifier defined under said first communication method, begin a process for establishing connection with said second connection control device in accordance with said second communication method.

11. The information processing apparatus according to claim 2, further comprising:
an access controller in accordance with said first communication method;
an access controller in accordance with said second communication method; and
a bridge connecting said access controller in accordance with said second communication method and said access controller in accordance with said first communication method, to mediate between communication by said first communication method and communication by said second communication method.

12. The information processing apparatus according to claim 2, wherein
said providing unit is configured to provide said relay destination determining unit with the second identifier defined under said first communication method as a dummy.

13. The information processing apparatus according to claim 2, wherein
narrow area wireless communication with said first connection control device is established under said first communication method, and
wide area wireless communication with said second connection control device is established under the second communication method.

14. The information processing apparatus according to claim 2, wherein
defined identifiers under said first communication method are identifiers of a respective network.

15. A computer implemented method of performing network communications with a system including at least one information processing apparatus configured to connect to a network through any of a first connection control device and a second connection control device associated with the network, said system including a first communication unit for communication with said first connection control device in accordance with a first communication method, and a second communication unit for communication with said second connection control device in accordance with a second communication method different from said first communication the computer implemented method comprising:
obtaining a first identifier defined under said first communication method from said first connection control device;
determining, via the at least one information processing apparatus, a connection control device identified under the first identifier to be a relay destination for connection to said network;
providing a second identifier defined under said first communication method, for indicating said second connection control device to be a relay destination;
determining, via the at least one information processing apparatus, any of said first connection control device and said second connection control device to be the relay destination, based on the obtained first identifier and the provided second identifier; and
establishing a connection to said network through said second connection control device via the second communication method by using the second identifier defined under said first communication method.

16. An information processing system including an information processing apparatus connectable to a network by any of communication in accordance with a first communication method with a first connection control device connected to the network and a second communication method, different from the first communication method, with a second connection control device connected to the network, through any of said first connection control device and said second connection control device, the system comprising:
- an obtaining unit configured to obtain a first identifier defined under said first communication method, from said first connection control device;
- a relay destination determining unit configured to determine said first connection control device to be a relay destination for connection to said network, based on the obtained first identifier;
- a providing unit configured to provide said relay destination determining unit with a second identifier defined under said first communication method, for indicating said second connection control device to be the relay destination; and
- a connecting unit configured to establish a connection to said network through said second connection control device via the second communication method by using the second identifier defined under said first communication method,
- wherein said relay destination determining unit is further configured to determine any of said first connection control device and said second connection control device to be the relay destination, based on the obtained first identifier and the provided second identifier provided by said providing unit.

17. An information processing system comprising:
- a first information processing apparatus connectable to a network by communication in accordance with a first communication method with a first connection control device connected to the network, through said first connection control device; and
- a second information processing apparatus connectable to the network by any of communication in accordance with the first communication method with said first connection control device and communication in accordance with a second communication method, different from the first communication method, with a second connection control device connected to the network, through any of said first connection control device and said second connection control device; wherein
- said first information processing apparatus includes an obtaining unit configured to obtain a first identifier defined under said first communication method from said first connection control device;
- said second information processing apparatus includes:
  - said obtaining unit;
  - a providing unit for providing a second identifier defined under said first communication method, for indicating said second connection control device to be a relay destination; and
  - a connecting unit configured to establish a connection to said network through said second connection control device via the second communication method by using the second identifier defined under said first communication method,
- if a computer of said first information processing apparatus executes an information processing program, said first information processing apparatus is configured to provide a function of connecting to said network through said first connection control device, based on the first identifier, and
- if a computer of said second information processing apparatus executes said information processing program, said second information processing apparatus is configured to provide a function of connecting to said network through the first connection control device based on the first identifier and said second connection control device based on the second identifier defined under said first communication method.

18. The information processing system according to claim 17, wherein:
- in said information processing program, the second identifier defined under said first communication method is specified to indicate said second connection control device to be a relay destination; and
- said second identifier is validated if said information processing program is executed by said second information processing apparatus.

19. An information processing apparatus having compatibility to another information processing apparatus that includes a first communication unit configured to communicate with a first connection control device connected to a network in accordance with a first communication method, an obtaining unit for obtaining a first identifier defined under said first communication method from said first connection control device, and a relay destination determining unit configured to determine said first connection control device to be a relay destination for connection to said network, based on the first identifier obtained by said obtaining unit, the information processing apparatus comprising:
- said first communication unit;
- a second communication unit configured to communication with a second connection control device connected to said network in accordance with a second communication method different from said first communication method;
- said relay destination determining unit;
- a providing unit for providing said relay destination determining unit with a second identifier defined under said first communication method, for indicating said second connection control device to be a relay destination; and
- a connecting unit configured to establish a connection to said network through said second connection control device via the second communication method by using the second identifier defined under said first communication method,
- wherein said relay destination determining unit is operative to determine any of said first connection control device and said second connection control device to be the relay destination based on the second identifier provided by said providing unit.

* * * * *